US011638275B2

(12) United States Patent
Kim et al.

(10) Patent No.: US 11,638,275 B2
(45) Date of Patent: Apr. 25, 2023

(54) METHOD FOR TRANSMITTING AND RECEIVING UPLINK CONTROL CHANNEL AND DEVICE THEREFOR

(71) Applicant: Electronics and Telecommunications Research Institute, Daejeon (KR)

(72) Inventors: Cheul Soon Kim, Daejeon (KR); Sung Hyun Moon, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 339 days.

(21) Appl. No.: 16/961,579

(22) PCT Filed: Jan. 8, 2019

(86) PCT No.: PCT/KR2019/000268
§ 371 (c)(1),
(2) Date: Jul. 10, 2020

(87) PCT Pub. No.: WO2019/139330
PCT Pub. Date: Jul. 18, 2019

(65) Prior Publication Data
US 2021/0345362 A1 Nov. 4, 2021

(30) Foreign Application Priority Data

Jan. 12, 2018 (KR) .................. 10-2018-0004467
Feb. 14, 2018 (KR) .................. 10-2018-0018736
(Continued)

(51) Int. Cl.
*H04W 72/12* (2009.01)
*H04L 5/00* (2006.01)
(Continued)

(52) U.S. Cl.
CPC ....... *H04W 72/1242* (2013.01); *H04L 5/0012* (2013.01); *H04W 72/0446* (2013.01);
(Continued)

(58) Field of Classification Search
CPC ......... H04W 72/1242; H04W 72/0446; H04W 72/1268; H04W 72/1284; H04W 80/02;
(Continued)

(56) References Cited

U.S. PATENT DOCUMENTS 9,907,057 B2   2/2018  Wang et al.
2012/0113942 A1  5/2012  Kim
(Continued)

FOREIGN PATENT DOCUMENTS

WO   2012036479 A1   3/2012
WO   2014052730 A1   4/2014
(Continued)

OTHER PUBLICATIONS

ETRI R1-1720226: UCI multiplexing of different usage scenario Dec. 2017 (Year: 2017).*
(Continued)

*Primary Examiner* — Rina C Pancholi
(74) *Attorney, Agent, or Firm* — William Park & Associates Ltd.

(57) ABSTRACT

A method for transmitting an uplink control channel by a terminal may comprise the steps of: receiving, from a base station, information on resources for transmitting a first SR and a second SR; when the symbols of a first uplink control channel including the first SR partially or completely overlap the symbols of a second uplink control channel including the second SR, comparing the priority of the first SR and the priority of the second SR; and when the priority of the second SR is higher than the priority of the first SR, transmitting the second uplink control channel without (Continued)

transmitting some or all of the symbols of the first uplink control channel.

14 Claims, 23 Drawing Sheets

(30) Foreign Application Priority Data

| Apr. 5, 2018 | (KR) | 10-2018-0039955 |
|---|---|---|
| May 2, 2018 | (KR) | 10-2018-0050906 |
| May 11, 2018 | (KR) | 10-2018-0054479 |
| Aug. 10, 2018 | (KR) | 10-2018-0093608 |
| Aug. 24, 2018 | (KR) | 10-2018-0099449 |
| Nov. 2, 2018 | (KR) | 10-2018-0133850 |

(51) Int. Cl.
*H04W 72/0446* (2023.01)
*H04W 72/1268* (2023.01)
*H04W 80/02* (2009.01)

(52) U.S. Cl.
CPC ... *H04W 72/1268* (2013.01); *H04W 72/1284* (2013.01); *H04W 80/02* (2013.01)

(58) Field of Classification Search
CPC ............. H04W 28/02; H04W 72/0493; H04W 28/0278; H04W 72/0413; H04W 72/042; H04W 72/044; H04W 72/12; H04L 5/0012; H04L 5/001; H04L 5/0055; H04L 5/0064; H04L 5/0094; H04L 5/0053; H04L 5/0091
See application file for complete search history.

(56) References Cited

U.S. PATENT DOCUMENTS

| 2016/0226649 | A1* | 8/2016 | Papasakellariou | H04L 5/006 |
|---|---|---|---|---|
| 2017/0295006 | A1 | 10/2017 | Han et al. | |
| 2017/0318574 | A1 | 11/2017 | Choi et al. | |
| 2018/0139764 | A1* | 5/2018 | Hwang | H04L 1/08 |
| 2019/0045529 | A1* | 2/2019 | Xiong | H04W 72/0406 |

FOREIGN PATENT DOCUMENTS

| WO | 2015044405 A1 | 4/2015 |
|---|---|---|
| WO | 2016182260 A1 | 11/2016 |
| WO | 2016186886 A1 | 11/2016 |

OTHER PUBLICATIONS

Samsung R1-1717665: Procedures for UL transmissions Oct. 2017 (Year: 2017).*
Huawei R2-1710109: SR procedure in NR Oct. 2017 (Year: 2017).*
U.S. Appl. No. 62/556,993 Xiong et al. Sep. 2017 (Year: 2017).*
NTT R1-1718156: Proposals for SR configurations Oct. 2017 (Year: 2017).*
Procedures for UL Transmissions, 3GPP TSG RAN WG1 #90bis, R1-1717665, 9th-13th, pp. 1-10, Oct. 2017, Samsung, Prague, CZ.
Proposals for SR configuration, 3GPP TSG RAN WG1 Meeting #90bis, R1-1719156, Oct. 9-13, 2017, Prague, Czech Republic.
SR procedure in NR, 3GPP TSG-RAN2 Meeting #99bis, R2-1710109, Oct. 9-13, 2017, pp. 1-6, Huawei, HiSilicon, Prague, Czech Republic.
UCI multiplexing of different usage scenario, 3GPP TSG RAN WG1 Meeting 91, R1-1720226, Nov. 27-Dec. 1, 2017, pp. 1-3, ETRI, Reno, USA.

* cited by examiner

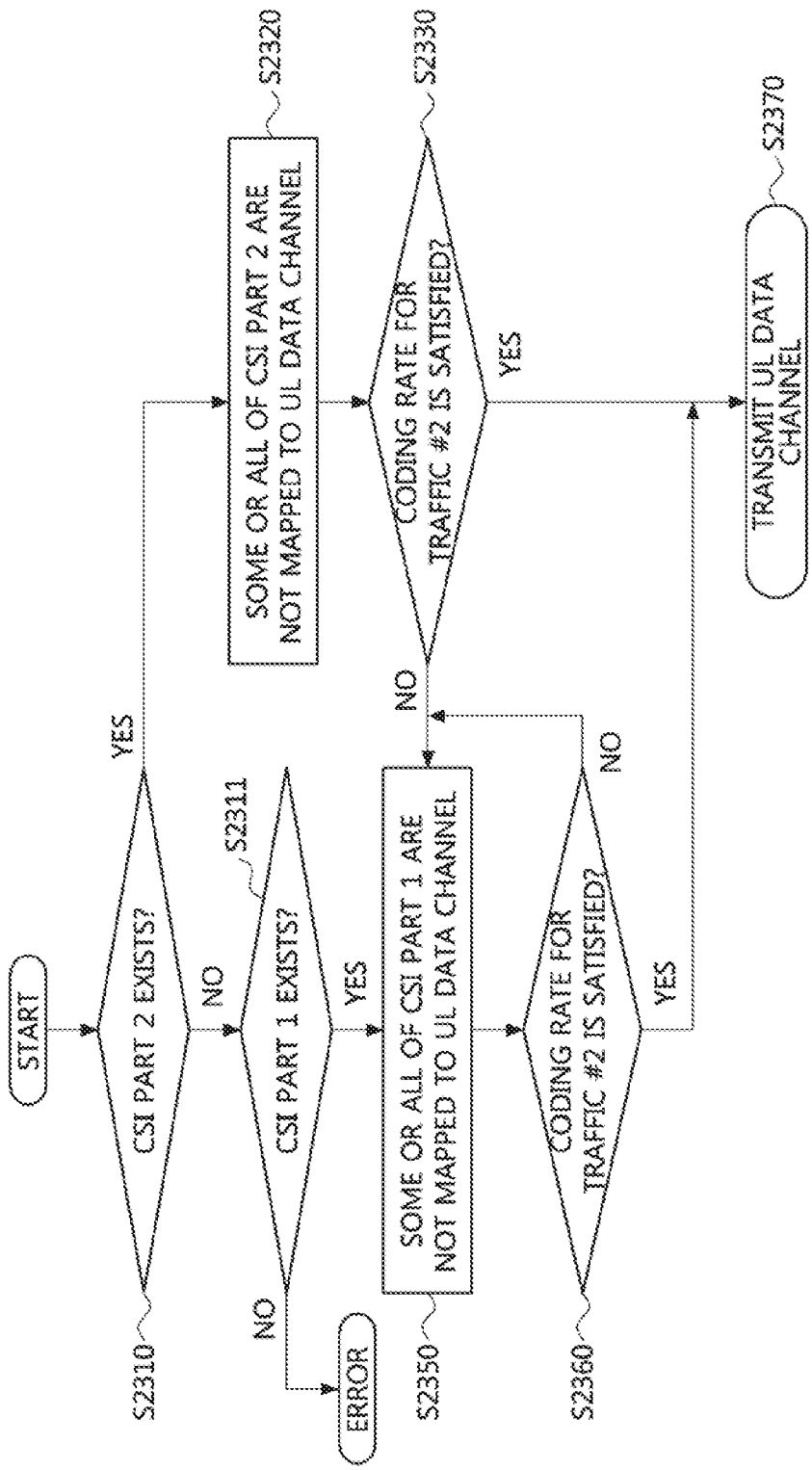

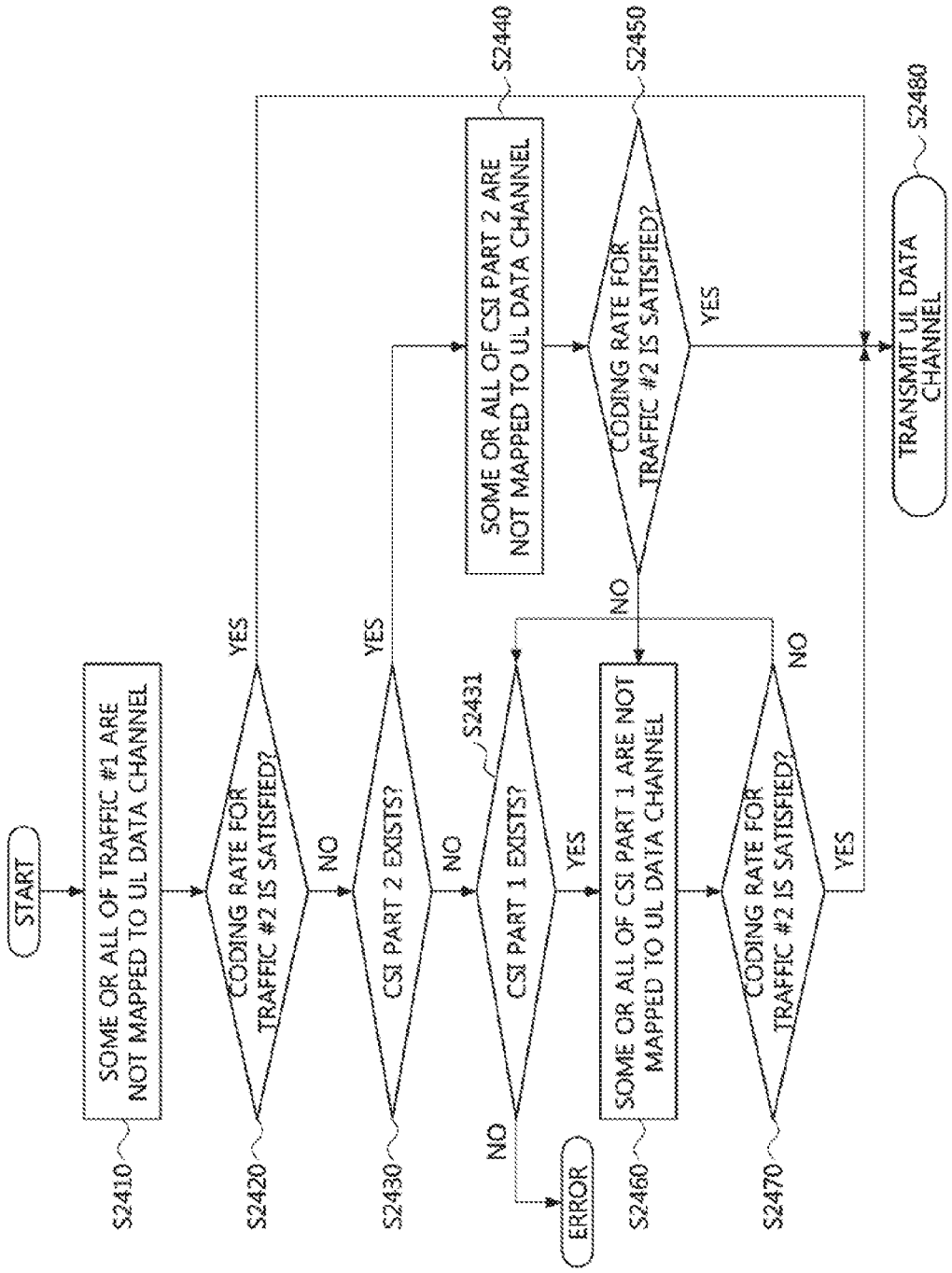

METHOD FOR TRANSMITTING AND RECEIVING UPLINK CONTROL CHANNEL AND DEVICE THEREFOR

TECHNICAL FIELD

The present invention relates to a mobile communication system, and more particularly, to a method for transmitting and receiving an uplink control channel in a mobile communication system, and an apparatus for the same.

BACKGROUND ART

In the 3rd Generation Partnership Project (3GPP) New Radio (NR) system, in order to transmit an uplink (UL) control channel, a terminal is required to derive an index of a resource through which the UL control channel is transmitted based on a downlink (DL) control channel from a serving base station. However, the conventional method of indicating the index that the UL control channel has to the terminal by the serving base station may degrade the efficiency of the communication system.

Also, uplink control information (UCI) transmitted through the UL control channel, such as a scheduling request (SR), channel state information (CSI), and hybrid automatic repeat request (HARQ) acknowledgment (ACK) information, may be repeatedly transmitted and may be multiplexed and transmitted in the same slot. In this case, the repetitive transmission method of UCI and the multiplexing method of different types of UCIs need to be specified.

DISCLOSURE

Technical Problem

The objective of the present invention for solving the above-described problem is to provide an operation method of a terminal for transmitting uplink control information.

The objective of the present invention for solving the above-described problem is to provide an operation method of a base station for receiving uplink control information.

The objective of the present invention for solving the above-described problem is to provide a terminal for transmitting uplink control information and a base station for receiving uplink control information.

Technical Solution

As a method for transmitting an uplink control channel performed in a terminal, an embodiment of the present invention for achieving the above-described objective may comprise receiving, from a base station, information on resources for transmitting a first scheduling request (SR) and a second SR and information on priorities of the first SR and the second SR or information used for deriving the priorities of the first SR and the second SR; comparing the priority of the first SR with the priority of the second SR, when a part or all of symbols of a first uplink control channel including the first SR overlap a part or all of symbols of a second uplink control channel including the second SR; and transmitting the second uplink control channel without transmitting the part or all of the symbols of the first uplink control channel, when the priority of the second SR is higher than the priority of the first SR.

The second SR may correspond to a low-latency traffic as compared to a traffic corresponding to the first SR.

When a part or all of the symbols of the first uplink control channel are not transmitted, a medium access control (MAC) layer of the terminal may increase a repeated transmission counter for the second SR without increasing a repeated transmission counter for the first SR.

The method may further comprise, after the transmitting the second uplink control channel, transmitting the first uplink control channel including the first SR.

As a method for transmitting an uplink control channel performed in a terminal, another embodiment of the present invention for achieving the above-described objective may comprise receiving, from a base station, information on a period of repeated transmissions and a number of repeated transmissions for a scheduling request (SR); and repeatedly transmitting an uplink control channel including the SR by the number of repeated transmissions according to the period of repeated transmissions, wherein the uplink control channel including the SR is transmitted once or two times in a slot.

The period of repeated transmissions may correspond to 7 symbols.

The number of repeated transmissions may be determined according to a type of a traffic corresponding to the SR or a format of the uplink control channel including the SR.

When the SR is transmitted once in a slot, the uplink control channel including the SR may be transmitted in same symbols in each slot.

When the SR is transmitted two times in a slot, the uplink control channel including the SR may be transmitted in same symbols in each slot or in different symbols in each slot.

When a part or all of symbols in which the uplink control channel including the SR is transmitted overlap with a part or all of symbols of an uplink control channel including uplink control information other than the SR, the uplink control channel including the SR and the uplink control channel including the uplink control information other than the SR may be transmitted as multiplexed.

Different transmission powers may be applied to symbols in which only the uplink control channel including the SR is transmitted, symbols in which the uplink control channel including the SR and the uplink control channel including the uplink control information other than the SR are transmitted as multiplexed, and symbols in which only the uplink control channel including the uplink control information other than the SR is transmitted.

When the uplink control channel including the SR is not transmitted in symbols according to the period of repeated transmissions, a medium access control (MAC) layer of the terminal may not increase a repeated transmission counter for the SR.

When the SR is transmitted two or more times in a slot, the SR may be frequency-hopped within a slot or frequency-hopped at a slot boundary according to a configuration through upper layer signaling of the base station.

When the SR is frequency-hopped within a slot, the SR may be frequency-hopped at a half-slot boundary.

As a method for transmitting an uplink control channel performed in a terminal, yet another embodiment of the present invention for achieving the above-described objective may comprise receiving, from a base station, information on a period of repeated transmissions and a number of repeated transmissions for a first scheduling request (SR) and information on a period of repeated transmissions and a number of repeated transmissions for a second SR; comparing a priority of the first SR with a priority of the second SR, when a part or all of symbols of a first uplink control channel including the first SR according to the period of repeated transmissions for the first SR overlap with a part or all of symbols of a second uplink control channel including the second SR according to the period of repeated transmissions for the second SR; and transmitting the second uplink control channel without transmitting a part or all of the symbols of the first uplink control channel, when the priority of the second SR is higher than the priority of the first SR, wherein each of the uplink control channel including the first SR and the uplink control channel including the second SR is transmitted once or two times in a slot.

Each of the period of repeated transmissions for the first SR and the period of repeated transmissions for the second SR may correspond to 7 symbols.

The number of repeated transmissions for the first SR may be determined according to a type of a traffic corresponding to the first SR or a format of the uplink control channel including the first SR, and the number of repeated transmissions for the second SR may be determined according to a type of a traffic corresponding to the second SR or a format of the uplink control channel including the second SR.

The second SR may be an SR corresponding to a low-latency traffic as compared to a traffic corresponding to the first SR.

When the first SR or the second SR is transmitted two or more times in a slot, the first SR or the second SR may be frequency-hopped within a slot or frequency-hopped at a slot boundary according to a configuration through upper layer signaling of the base station.

When a part or all of the symbols of the first uplink control channel are not transmitted, a medium access control (MAC) layer of the terminal may increase a repeated transmission counter for the second SR without increasing a repeated transmission counter for the first SR.

Advantageous Effects

According to the embodiments of the present invention, the UL control channel can be efficiently transmitted and received in the communication system.

DESCRIPTION OF DRAWINGS

FIG. 23 is a conceptual diagram illustrating a method of mapping CSI (when only UCI exists) after traffic #2 is generated; and FIG. 24 is a conceptual diagram illustrating a method of mapping CSI (when both UCI and traffic #1 exist) after traffic #2 is generated.

MODES OF THE INVENTION

Figure 1:
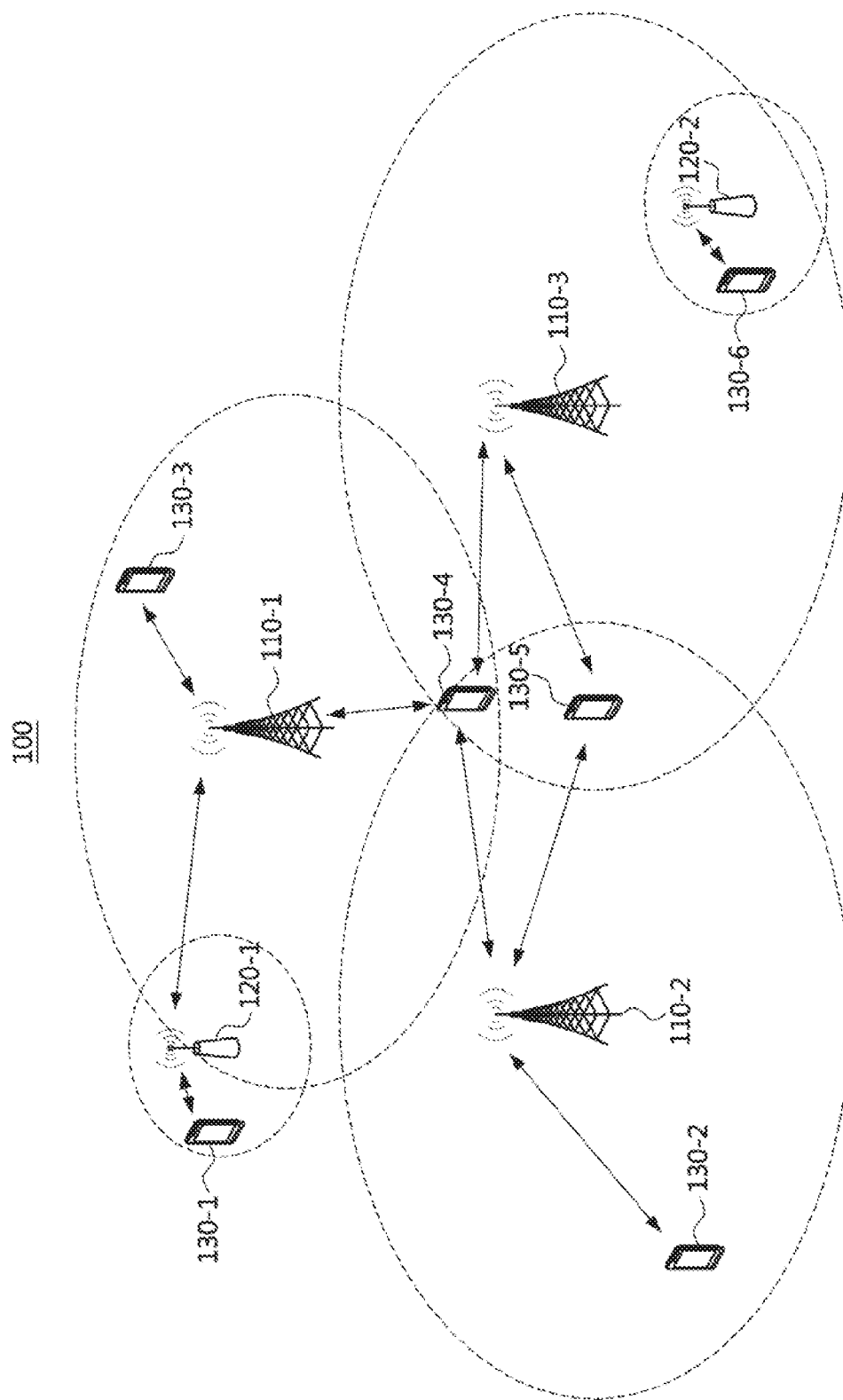
FIG. 1 is a conceptual diagram illustrating a mobile communication system according to a first embodiment of the present disclosure.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings.

Throughout the specification, a terminal may be a mobile terminal (MT), a mobile station (MS), an advanced mobile station (AMS), a high reliability mobile station (HR-MS), a subscriber station (SS), a portable subscriber station (PSS), an access terminal (AT), an user equipment (UE), or the like. Also, the terminal may include all or a part of functions of MT, MS, AMS, HR-MS, SS, PSS, AT, UE, or the like.

Also, a base station may be an advanced base station (ABS), a high reliability base station (HR-BS), a node B, an evolved node B (eNB), an access point (AP), a radio access station (RAS), a base transceiver station (BTS), a mobile multi-hop relay (MMR)-BS, a relay station (RS) performing a role of the base station, a high reliability relay station (HR-RS) performing a role of the base station, a small cell base station, or the like. Also, the base station may include all or a part of functions of BS, ABS, HR-BS, node B, eNB, AP, RAS, BTS, MMR-BS, RS, HR-RS, small cell base station, or the like.

FIG. 1 is a conceptual diagram illustrating a mobile communication system according to a first embodiment of the present disclosure.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
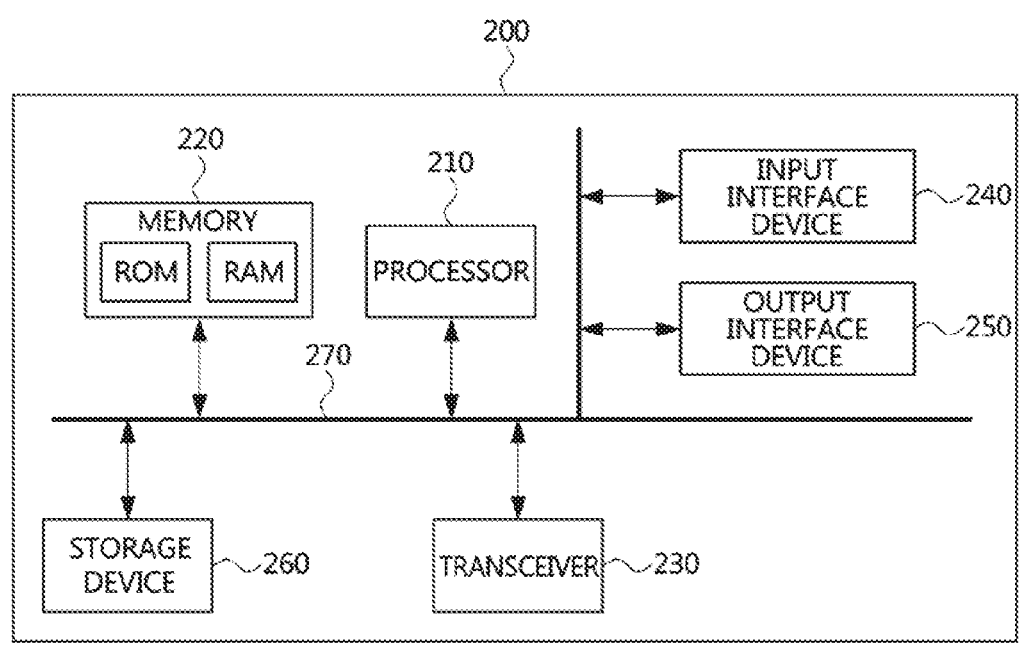
FIG. 2 is a block diagram illustrating a communication node in a mobile communication system according to a first embodiment of the present disclosure.

FIG. 2 is a block diagram illustrating a communication node in a mobile communication system according to a first embodiment of the present disclosure.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, or the like. Also, each of the plurality of terminals 130-1, 130-2, 130-3, 130-4, 130-5, and 130-6 may refer to a terminal, an access terminal, a mobile terminal, a station, a subscriber station, a mobile station, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support a long-term evolution (LTE), a LTE-Advanced (LTE-A), or the like defined in the cellular communication standard (e.g., 3GPP standard). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 1304, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink transmission and SC-FDMA based uplink transmission. Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Determination of PUCCH Transmission Resource Index

Figure 3:
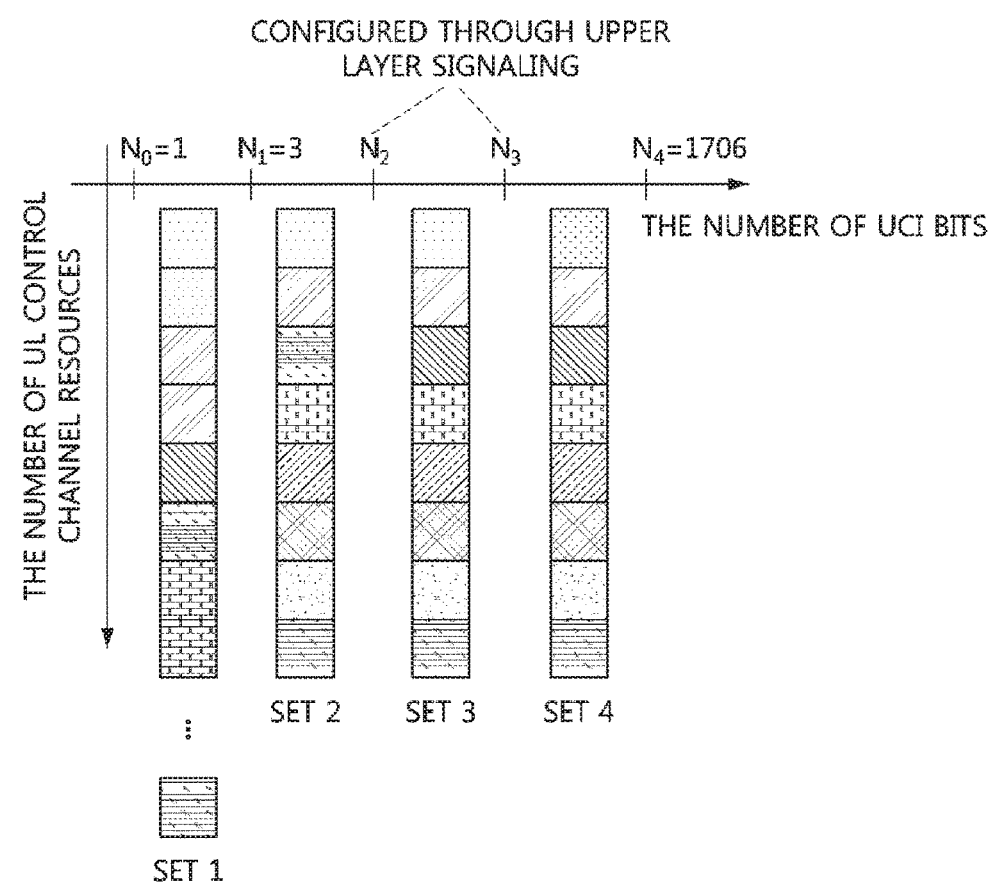
FIG. 3 is a conceptual diagram illustrating a configuration example of uplink control channel sets.

FIG. 3 is a conceptual diagram illustrating a configuration example of sets of uplink control channel.

A serving base station may configure at least one DL control resource set (CORESET) to a terminal through upper layer signaling, and configure a monitoring periodicity and a search space of DL control channels that the terminal should monitor through upper layer signaling. The terminal should search for a DL control channel in each CORESET configured from the serving base station. The DL control channel may allocate a DL data channel, and may indicate to the terminal a position of a slot in which an HARQ-ACK for the DL control channel is to be transmitted.

Meanwhile, the serving base station may configure to the terminal a set of resources through which a UL control channel can be transmitted through upper layer signaling. Each element constituting the set may be a resource that uniquely defines a UL control channel, and may indicate the number of physical resource block(s) (PRB(s)) of the UL control channel, a starting position of the PRB(s) of the UL control channel, a starting position of symbol(s) in which the UL control channel is transmitted, the number of symbol(s) (e.g., duration) that the UL control channel has, and the like. Also, each of the elements may include information on a sequence used by the UL control channel (a spreading sequence index or an orthogonal cover code (OCC) index, etc.). Here, the number of the symbol(s) that the UL control channel has is not limited, and the serving base station may configure the terminal through upper layer signaling, so that one set includes both a UL control channel having less than 4 symbols and a UL control channel having 4 or more symbols.

The serving base station may configure a plurality of resources to the terminal and divide the resources into a plurality of sets. Among these sets, the terminal may select one set according to the number of UCI bits to be transmitted through the UL control channel. For example, the serving base station may configure values of $N_2$ and $N_3$ through upper layer signaling. The serving base station and the terminal are aware of the values of $N_0$ (e.g., $N_0=1$), $N_1$ (e.g., $N_1=3$) and $N_4$ (e.g., $N_4=1706$) as fixed values. The terminal may select a k-th (e.g., k=0, 1, 2, 3) set when the number of UCI bits belongs to a range of $\{N_k, N_{k+1}, \ldots, N_{k-1}\}$. The terminal may indirectly derive the number of UCI bits from a value of 'total Downlink Assignment Index (DAI)' of a DL control channel that allocates a DL data channel. For example, when the serving base station configures code block group (CBg) to the terminal, the terminal may know the number of transport blocks (TBs) from the total DAI value, may know how many CBgs constitute one TB, and thus may know the number of UCI bits. When the CBg is not configured for the terminal, the terminal may know the number of UCI bits because the terminal knows the number of TBs from the total DAI value.

The terminal may select one of resource sets configured by the upper layer signaling based on the number of UCI bits. In order to select one element belonging to the selected set, the serving base station may configure a subset of the selected set to the terminal through upper layer signaling. The number of elements constituting the corresponding set is N (1≤N≤8), and the serving base station may configure each element to the terminal through upper layer signaling. One subset may correspond to a value of a Physical Uplink Control Channel (PUCCH) resource indicator (PRI). Such the indicator (i.e., PRI) may be included in a DL control channel through which the serving base station allocates a DL data channel to the terminal. The terminal may select a subset by detecting the PRI from the DL control channel that allocates the DL data channel.

The subset may have resource indexes of one or more UL control channels as elements. When there is only one element in the subset, the terminal may determine the index of the UL control channel from the subset determined only by the PRI. When the subset has more than one element, in order to specify one element, the terminal needs an index of a control channel element (CCE) to which the UL control channel was mapped as information other than the PRI.

For example, as shown in FIG. 3, the terminal may be configured with 4 sets. Each set is divided into subsets, and may be distinguished into 8 subsets by using the PRI. According to the conventional technical specification (i.e., the NR technical specification (TS)), a set #2, a set #3, and a set #4 have only 8 elements each, so that one element can be determined using the PRI only. However, in the case of a set #1, since it may have 8 to 32 elements, when 8 elements exist, one element can be determined by only the PRI. However, in the case of having 9 elements or more to 32 elements or less, a case where a subset has more than one element may occur. In this case, one element may be determined using a CCE index of the UL control channel and the number of CCEs of the CORESET. That is, it may be possible to determine an element in the subset by using a ratio of the CCE index and the number of CCEs of the CORESET.

For example, when 3 bits are to be transmitted through a UL control channel (i.e., the number of UCI bits is 3), the terminal may select the set #2 since $N_1 \leq 3 < N_2$. When the value indicated by the PRI is 2, the terminal may select a subset #2. Since the number of elements belonging to the subset #2 is 1, the terminal may generate the UL control channel using the element. As another example, when the terminal needs to transmit ($N_3$+1) bits through a UL control channel, the terminal may select the set #4. When the value indicated by the PRI is 0, the terminal may select a subset #0. Since the subset #0 has one element, the terminal may generate the UL control channel using the element. As yet another example, when the terminal needs to transmit 2 bits through a UL control channel, the terminal may select the set #1 since $N_0 \leq 2 < N_1$. The terminal may select a subset #3 based on a value (e.g., 3) received as the PRI. Since the subset #3 has 2 elements, the terminal should be able to select one of the 2 elements using additional information. In this case, one of the 2 elements may be selected according to the ratio of the CCE index and the number of CCEs of the CORESET.

Also, after the terminal determines the resource of the UL control channel, a procedure for mapping the UL control channel to a physical resource may be necessary. In particular, a bandwidth part (BWP) should be considered. A BWP may have a narrower bandwidth than a system bandwidth, and each BWP may have a different OFDM numerology such as subcarrier spacing (SPS) and cyclic prefix (CP) length of an OFDM signal.

In a FDD system, an active UL BWP may not be changed using a DL control channel (i.e., DL-related DCI) allocating a DL data channel, but only an active DL BWP may be changed by using the DL-related DCI. Also, the active UL BWP may be changed using a DL control channel (i.e., UL-related DCI) allocating a UL data channel. On the other hand, in a TDD system, a DL control channel may be used to change both the active DL BWP and the active UL BWP. Since the serving base station transmits to the terminal a configuration parameter for linking a DL BWP and a UL BWP through upper layer signaling, if the active DL BWP is changed by a DL control channel allocating a DL data channel, one of UL BWPs is activated according to the configuration parameter. Conversely, when the active UL BWP is changed by a DL control channel allocating a UL data channel, one of DL BWPs is activated according to the configuration parameter.

Figure 4:
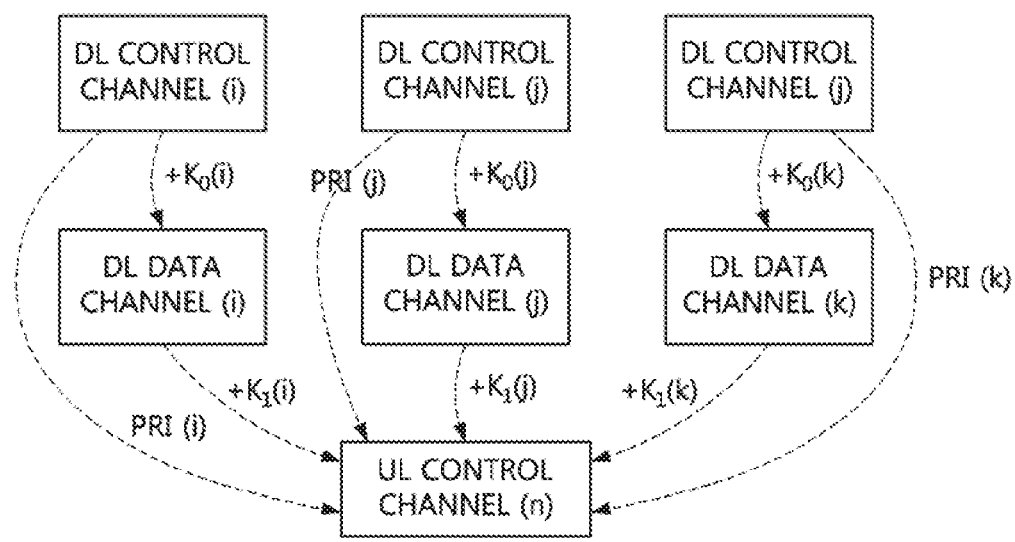
FIG. 4 is a conceptual diagram illustrating a configuration example of a PRI when one serving cell is configured.

FIG. 4 is a conceptual diagram illustrating a configuration example of a PRI when one serving cell is configured.

In order to describe a step in which a terminal determines a resource of a UL control channel, a method of determining a resource index of a UL control channel and a method of determining a UL BWP to which a PRI is applied will be described.

(1) Method for Determining a Resource Index of a UL Control Channel

As a method for determining a resource index of a UL control channel, when the serving base station configures two or more elements belonging to one subset to the terminal through upper layer signaling, a method for a terminal to select one element may be considered.

When the terminal is configured with a semi-static HARQ-ACK codebook, the terminal may know the number of UCI bits, and thus may know a set having resource indexes of the UL control channel as elements. When the terminal is configured with a dynamic HARQ-ACK codebook, the terminal may estimate the number of UCI bits by receiving a total DAI from a DL control channel that allocates a DL data channel, and thus may estimate a set having resource indexes of the UL control channel as elements.

When the serving base station configures the terminal to have two or more elements in one subset, the terminal should select one element using information other than the PRI. As an example of such the information, a DL control channel allocating a DL data channel may be used. Since a DL control channel is configured by aggregating one or more CCEs, the smallest index of the CCEs may be used. The terminal may use this index to select one element from a subset having resources of UL control channels as elements. Also, since the terminal can receive a DL control channel in a plurality of CORESETs, it may be preferable that the smallest index $k_j$ of the CCEs is represented together with the index j of the CORESET to which the received DL control channel belongs. Thus, in the subset of resources of UL control channels, one element should have a one-to-one correspondence with (j, $k_j$).

However, when the terminal uses such the CCE index, if the terminal does not receive the DL control channel, the terminal may not use the corresponding CCE index and thus may not obtain a correct resource of the UL control channel. As shown in FIG. 4, DL control channels allocate DL data channels (each of i, j and k corresponds to a slot index), and the terminal may generate a UL control channel corresponding to a received DL data channel. Each DL control channel has a PRI. For convenience of explanation, it may be assumed that i<j<k and one serving cell is configured. According to the above description, the indices of the slots in which the PRI is received may respectively correspond to n-$K_1$(i)-$K_0$(i), n-$K_1$(j)-$K_0$(j), and n-$K_1$(k)-$K_0$(k). If the terminal receives a DL control channel (i) and decodes a DL data channel (i), the terminal may derive a UL control channel (n) using a PRI (i) belonging to the DL control channel (i). Then, if the terminal receives a DL control channel (j) and decodes a DL data channel (j), the terminal may derive a UL control channel (n) using a PRI (j) belonging to the DL control channel (j). Then, if the terminal receives a DL control channel (k) and decodes a DL data channel (k), the terminal may derive a UL control channel (k) using a PRI ( ) belonging to the DL control channel (k). This scheme may be applied to an arbitrary number of DL control channels.

As described above, the terminal may apply the most recently-detected PRI from one or more DL control channels associated to the same UL control channel, thereby selecting a subset. The above-described method may be used as the method of selecting one resource in the subset. The terminal may select one UL control channel resource by using the CCE index that the most recently-detected DL control channel (i.e., the DL control channel (k) of FIG. 4) has or by using a function of the CCE index and the CORESET index.

Figure 5:
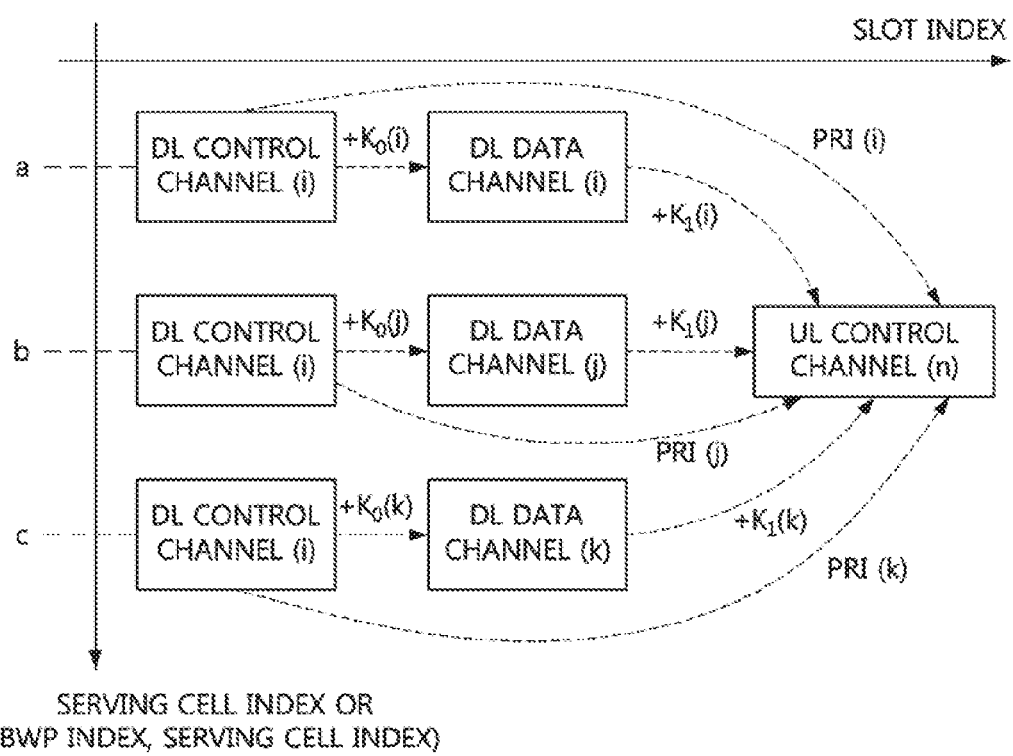
FIG. 5 is a conceptual diagram illustrating a configuration example of a PRI when a plurality of serving cells are configured.

FIG. 5 is a conceptual diagram illustrating a configuration example of a PRI when a plurality of serving cells are configured.

On the other hand, considering a case where two or more serving cells are configured in the terminal, it may be difficult to apply the method of selecting one element in one subset. This is because it is difficult to define the most recently-detected PRI since several DL control channels are received in two or more serving cells. Such the case is shown in FIG. 5. 3 serving cells may be configured to a terminal by using indices a, b, and c (e.g., a>b>c). One index may correspond to a BWP or a pair of (BWP, serving cell) and may be referred to as a 'serving cell index' for convenience. It may be assumed that serving cells a, b, and c transmit HARQ-ACK using the same UL control channel. In FIG. 5, there are 3 PRI values for determining a subset to transmit a UL control channel in FIG. 5. PRI (i), PRI (j), and PRI (k) are values obtained from the most recently-detected DL control channel in the respective serving cells. In this case, the terminal may determine one subset using the PRI obtained from the most recently-detected DL control channel among the DL control channel (i), the DL control channel (j) and the DL control channel (k), and select a resource to be used for the UL control channel within the determined subset by using the CCE index or by using a function of the CCE index and the CORESET index. However, when the most recently-detected DL control channel is two or more in time, one UL control channel resource cannot be selected by the above rule only. FIG. 5 illustrates a case where 3 DL control channels are temporally identical.

In this case, the terminal may distinguish the DL control channels received at the same slot index using the serving cell indexes, considering the order of the serving cell indexes. The terminal may apply a rule of selecting one UL control channel resource by selecting the DL control channel having the lowest or highest serving cell index to which the DL control channel belongs among the most recently-received DL control channels.

When two or more CORESETs are configured to the terminal by the serving cell, the received DL control channels may be distinguished according to the CORESET index. The terminal may still detect multiple DL control channels even when the terminal selects the DL control channel resource having the lowest or the highest serving cell index among the most recently-received DL control channels. In this case, it is possible to apply a rule of selecting one UL control channel resource by selecting the DL control channel having the lowest or highest CORESET index.

The terminal may determine one DL control channel among the DL control channels successfully received by applying the above-described scheme, derive the PRI, the CCE, and the like from the determined DL control channel, and derive an index of a UL control channel resource by using them. Preferably, the serving base station may detect the UL control channel at one or more resources provided against a case where the terminal fails to receive the DL control channel(s). This is because the resource of the UL control channel is derived differently because the DL CCEs are different from each DL control channel and the terminal does not know the CCE index of the DL control channel that the terminal have failed to receive. Since a probability that the terminal does not receive all of the two DL control channels is scarce, it is sufficient for the serving base station to detect two or less resources.

While allocating a DL data channel by a DL control channel, the DL control channel may include the total DAI and a 'counter DAI'. Based on the total DAI and the counter DAI, the terminal may guess whether all DL control channels transmitted from the serving base station are received or a part of the DL control channels is not received. When the counter DAI included in the received DL control channel differs by 1 from the counter DAI previously known to the terminal, it may be interpreted that the terminal has successfully received the corresponding DL control channels. However, when the counter DAI differs by a value other than 1 from the previously known counter DAI, it may be interpreted that the terminal has not received a part of the DL control channels. In particular, a case where the DL control channels having the same total DAI and the same counter DAI are not detected in the same slot index may be considered. Such the case may occur when the serving base station configures two or more serving cells or two or more CORESETs to the terminal and the terminal also detects two or more DL control channels in the same slot. In other words, this may mean that the PRI and the CCE are derived by the above-described scheme and the DL control channel for determining the UL control channel resource is not detected. In this case, the terminal may preferably extract the PRI and the CCE from the DL control channel having the next order as described above. The serving base station may configure the same PRI value to the DL control channels transmitted in the same slot, so that the UL control channel resource is derived using only the PRI.

As an example of the above method, the serving base station may set the size of all subsets to be 1 so that the terminal can derive the UL control channel resource by using only the PRI. Since the terminal can derive the UL control channel resource without using the CCE index of the DL control channel, this case may correspond to a case where the serving base station explicitly informs the terminal of the UL control channel resource.

As another example of the above method, the serving base station may set the size of a specific subset to 2 or more. The terminal may not derive the UL control channel resource by only the PRI. The terminal may determine the UL control channel resource by using a field belonging to the DL control channel. For example, by using a power control (TPC) field belonging to the DL control channel, one of the elements belonging to the subset may be selected and the UL control channel resource may be derived therefrom. For two DL control channels, the serving base station may configure the terminal so that a UL control channel resource derived using a TPC field belonging to a first DL control channel is identical to a UL control channel resource derived using a DL CCE index that a second DL control channel has. As a specific example of applying the above method, one UL control channel resource may be determined by using the DL CCE index and the PRI in the DL control channel received by the terminal from the serving cell having the lowest or the highest serving cell index. Also, one UL control channel resource may be determined by using the PRI and the TPC in another DL control channel transmitted from the serving base station in the same slot (i.e., the DL control channel received by the terminal from the serving cell that does not have the lowest or the highest serving cell index). The terminal may regard the UL control channel resources derived in the above-described manner as being the same. When the above method is applied, the serving base station may reduce a burden of detecting two UL control channels provided against the case where the terminal does not receive the DL control channel(s). However, when there is only one DL control channel for determining the UL control channel resource, the serving base station may not know whether or not the terminal has updated the total DAI to the latest value.

When the number of DL control channels having the total DAI is 1 in a specific slot, the terminal may determine a set of UL control channel resources by using the total DAI of the DL control channel. The terminal may determine a first subset belonging to the set of UL control channel resources by using the PRI of the DL control channel. When there is more than one element in the first subset, the terminal may determine the index of the UL control channel resource (i.e., an element of the subset) by using the DL CCE index that the DL control channel has. When the terminal does not further detect a DL data channel from another DL control channel after the corresponding slot, the terminal may apply the UL control channel resource determined at this time.

When the total number of DL control channels having the total DAI is 2 or more in a specific slot, the terminal may determine a detected DL control channel as a first DL control channel by using a serving cell index, a DL BWP index, a CORESET index, or a combination thereof. In this case, a method for determination may follow a rule defined by the TS. The terminal may use the first DL control channel to determine the resource index of the UL control channel as described above (i.e., when the number of DL control channels having the total DAI is 1). The serving base station may maintain the total DAI included in other DL control channel to be equal to the total DAI included in the first DL control channel, and select a value that can indicate an element of the UL control channel form the first subset. The terminal may determine one element by the value of the TPC field of the first DL control channel, from the first subset composed of UL control channel resources from the first DL control channel. The terminal may assume that the element determined from the first DL control channel and the element determined from the other DL control channel are equal to each other.

Meanwhile, since the number of cases which the TPC field can represent is limited, the serving base station should signal the terminal considering this limitation through upper layer signaling, so that the number of subsets having the UL control channel resources does not become greater than the number of cases. For example, when the TPC field is 2 bits, the number of elements in the subset should not be greater than 4.

(2) Method for Determining a UL BWP to which a PRI is Applied

As described above, a method for specifying a BWP may be configured differently in the FDD system and the TDD system. In the FDD system, the active UL BWP may not be changed using a DL control channel (i.e., DL-related DCI) allocating a DL data channel, and only the active DL BWP may be changed by the DL-related DCI. The active UL BWP may be changed by using a DL control channel (i.e., UL-related DCI) allocating a UL data channel. On the other hand, in the TDD system, the DL control channel may be used to change the active DL BWP and the active UL BWP together. Since the serving base station transmits a configuration parameter for linking a DL BWP and a UL BWP to the terminal through upper layer signaling, if the active DL BWP is changed by the DL control channel for allocating the DL data channel, one of the UL BWPs is activated according to the configuration parameter, and conversely, if the active UL BWP is changed by the DL control channel for allocating the UL data channel, one of the DL BWPs may be activated according to the configuration parameter.

In the FDD system, when the serving base station allocates a DL data channel to the terminal, an already-activated UL BWP should be used as a UL BWP for transmitting a UL control channel. The serving base station may calculate a PRI for the activated UL BWP, and may include the PRI in the DL control channel for transmitting the DL data channel. The terminal may assume that the UL BWP to which the received PRI is applied is the UL BWP activated in the slot in which the DL control channel is received. Since the serving base station is not sure that the terminal is able to always receive the DL control channel, the serving base station should not change the active UL BWP after the slot to which the DL control channel is allocated. Therefore, the serving base station may maintain the active UL BWP even when the serving base station transmits the DL control channel for allocating the UL data channel to the terminal. The reason is that, if the serving base station changes the active UL BWP, the terminal cannot know a resource for transmitting UCI (e.g., HARQ-ACK) because the UL BWP to which the PRI is applied is no longer valid.

Figure 6:
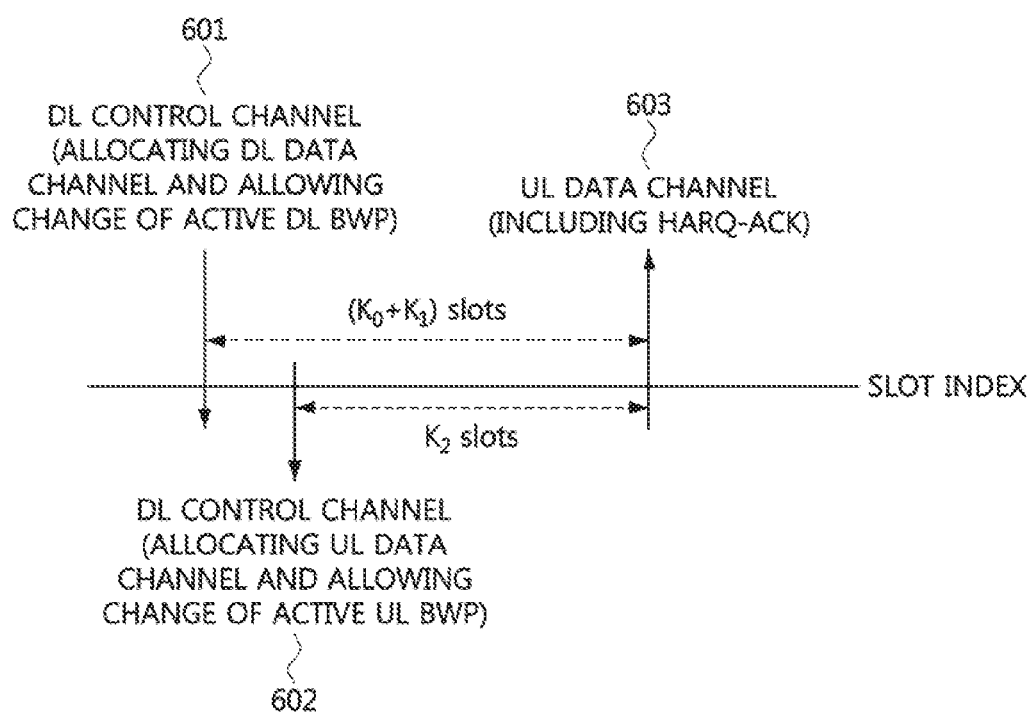
FIG. 6 is a conceptual diagram illustrating an example in which a UL data channel includes UCI when uplink data is allocated after downlink data allocation.

FIG. 6 is a conceptual diagram illustrating an example in which a UL data channel includes UCI when uplink data is allocated after downlink data allocation.

A method for determining a BWP to which a given PRI is applied is proposed. In a proposed method, the terminal may transmit UCI even when the serving base station changes a UL BWP. The serving base station may allocate a DL data channel by using a DL control channel 601, and may instruct the terminal to transmit UCI (i.e., HARQ-ACK) using a UL data channel 603 in a first slot after $(K_0+K_1)$ slots from the allocation of the DL data channel. Meanwhile, the serving base station may change the active DL BWP used by the terminal by using the DL control channel 601. In case of the FDD systems, this may have no effect on the active UL BWP. The serving base station may then instruct the terminal to transmit the UL data channel in a second slot after $K_2$ slots therefrom by using the DL control channel 602. When the serving base station instructs the terminal so that the first slot is identical to the second slot, the terminal may transmit the UCI in the UL data channel 603.

Therefore, when the UL data channel 603 is allocated, the serving base station may change the active UL BWP for the terminal even after the slot in which the DL control channel 601 for allocating the DL data channel to the terminal is transmitted. FIG. 6 illustrates an example in which the active UL BWP is changed once. However, when instructing the terminal to transmit the UCI using the UL data channel, the serving base station may change the active UL BWP by an arbitrary number of times.

On the other hand, unlike the FDD system, since the active UL BWP and the active DL BWP are changed together in the TDD system, if the method applied to the FDD system is applied without change, the active DL BWP should be maintained while the serving base station maintains the active UL BWP, and thus the serving base station may not flexibly cope with communication with the terminal. The terminal may not transmit the UL data channel even when it receives an instruction from the serving base station to receive the DL data channel using the new active DL BWP. Therefore, even though the terminal indirectly receives the instruction to change the active UL BWP from the serving base station, since the terminal does not transmit UL data actually, the terminal may not need to change to the active UL BWP. This is because the TDD system performs a half-duplex operation in which only one of a DL data channel and UL data channel is selected and transmitted by a DL control channel.

The serving base station may dynamically change the DL BWP according to a status of DL traffic. In order to generate a HARQ-ACK for this by the terminal and feedback it to the serving base station, it is necessary to use the PRI and the DL CCE included in the DL control channel for allocating the DL data channel. In this case, the index representing the UL control channel resource may be applied to the UL BWP forming a pair with the DL BWP indicated or changed by the DL control channel. At this time, the serving base station may transmit a BWP index to the terminal by including the BWP index in all DL control channels. The terminal may determine a time resource (e.g., a slot or a mini-slot) for transmitting the UL control channel according to a HARQ-ACK feedback time included in the DL control channel, and a plurality of DL data channels may use the same UL control channel to feed back HARQ-ACKs. The terminal may select one DL control channel among the DL control channels allocating such the DL data channels. In this case, the above-described methods may be applied as the method for selecting the DL control channel. For example, the terminal may select the most recently-detected DL control channel. Then, the terminal may detect a PRI for transmitting the UL control channel from the DL control channel, and may determine one UL control channel resource based on a combination of the PRI with the DL CCE. The terminal may apply the UL control channel resource to the UL BWP indicated to be active.

PUCCH Transmission (1) SR Multiplexing

When a serving base station configures a logical channel to a terminal through upper layer signaling, the serving station may associate one SR with the logical channel. One SR may correspond to one UL control channel, but may correspond to one or more logical channels (i.e., one logical channel group). Two or more logical channel groups may be configured to the terminal through upper layer signaling, and the terminal may compare priorities of the logical channel groups based on information configuring the respective logical channel groups.

When a scheduling request (SR) occurs, the terminal may transmit a UL control channel by using a resource configured by the serving base station through upper layer signaling. The serving base station may transmit a DL control channel to allocate a UL data channel to the terminal based on the SR. The terminal may be configured by the serving base station to perform two or more SR transmissions, and the serving base station may configure the terminal through upper layer signaling so that the terminal transmits one SR associated with one UL control channel. Some or all of UL symbols of a first UL control channel occupied by a first SR and some or all of UL symbols of a second UL control channel occupied by a second SR may overlap with each other.

When all of the UL symbols overlap, the terminal may compare priorities of two or more SRs, and may transmit UL symbols belonging to the highest priority SR. The priorities of the SRs may be configured to the terminal by the serving base station through upper layer signaling. The terminal may transmit only one SR (e.g., the second SR) among the first SR and the second SR to the serving base station.

When some of the UL symbols overlap, an operation of the terminal when the terminal has a sufficient processing time and an operation of the terminal when the terminal does not have a sufficient processing time may be defined differently. The case that a sufficient processing time is given to the terminal may correspond to a case that both the first SR and the second SR occur in the terminal before transmitting the SRs. In this case, the terminal may transmit only the second SR to the serving base station without transmitting the first SR according to the priorities.

Next, the case that a sufficient processing time is not given to the terminal may correspond to a case that the second SR occurs while the terminal is transmitting the first SR. In order to facilitate the implementation of the terminal, the terminal may transmit the first SR that is already being transmitted and then transmit the second SR in a next period. However, if the second SR is an SR corresponding to a low-latency traffic that has a higher priority and is hard to allow a latency time, the terminal should transmit the second SR in the current period. Accordingly, it may be desirable that the terminal transmits the second SR while transmitting only a part of the UL symbols constituting the first SR, or transmits the second SR without transmitting all the UL symbols of the first SR.

In a proposed method, if repeated transmissions (to be described later) are applied to the case described above (i.e., when the second SR is transmitted instead of the first SR), the MAC layer of the terminal may readjust the number of transmissions of the first SR. This is because the first SR is delivered from the MAC layer to the PHY layer, but the first SR is not transmitted in order to transmit the second SR according to the priorities. Applying this to the NR system, 'SR_COUNTER' and 'sr-TransMax' may be considered. In the MAC layer of the terminal, the SR_COUNTER corresponding to the first SR is incremented by 1. However, since the first SR is not actually transmitted, it is desirable to reduce the SR_COUNTER by 1 again.

In another proposed method, the SR_COUNTER may be readjusted only when the SR_COUNTER exceeds the sr-TransMax without being readjusted whenever the first SR cannot be transmitted. That is, the SR_COUNTER may be readjusted only when the SR_COUNTER is equal to (sr-TransMax-1) so that it is not equal to sr-TransMax.

In yet another proposed method, since all UL symbols belonging to the first SR are not transmitted by the PHY layer of the terminal, the terminal may transmit the first SR through a UL control channel in a first SR resource occurring first after transmitting the second SR. In this case, the number of times that the terminal repeatedly transmitted may be determined to be the number of transmissions that the terminal actually performed. In this case, the SR_COUNTER of the MAC layer may not be readjusted.

As a configuration example of applying the proposed methods, a case that, during transmission of the first SR, since a part of symbols of the first SR and the second SR overlap, the second SR is transmitted instead of the first SR may be considered.

As an example, the first SR may be configured through upper layer signaling so as to be repeatedly transmitted using a UL control channel format 1, but the second SR may not be repeatedly transmitted using a UL control channel format 0. As another example, both the first SR and the second SR may be configured through upper layer signaling so as to be repeatedly transmitted using the UL control channel format 1. As yet another example, the first SR may use the UL control channel format 1 but may not be repeatedly transmitted, and the second SR may use the UL control channel format 0 but may not be repeatedly transmitted.

(2) SR Repetition

In order to secure the coverage of the UL control channel including UCI, the serving base station may configure the terminal to repeatedly transmit the UL control channel through upper layer signaling. The UL control channel repeatedly transmitted may be limited to a case of having 4 or more UL symbols, and the number of repetitions configured by the base station may be always configured to be the same regardless of the format of the UL control channel, or may be configured differently for each format. Alternatively, one value may be configured to the terminal, and may be applied to all formats of the UL control channel. Since the UCI includes CSI and SR as well as HARQ-ACK, the terminal may repeatedly transmit SR several times. Therefore, repeated transmissions of the SR below may mean repeated transmissions of the UL control channel including the SR.

In this case, a value configured by the serving base station through upper layer signaling among values defined by the TS may be used as the repeated transmission periodicity of the SR. The SR may be configured for each BWP, and may use numerology of the BWP. According to this, the repeated transmission periodicity of the SR may be shorter than the length of one slot, or may be a plurality of slots.

Figure 7:
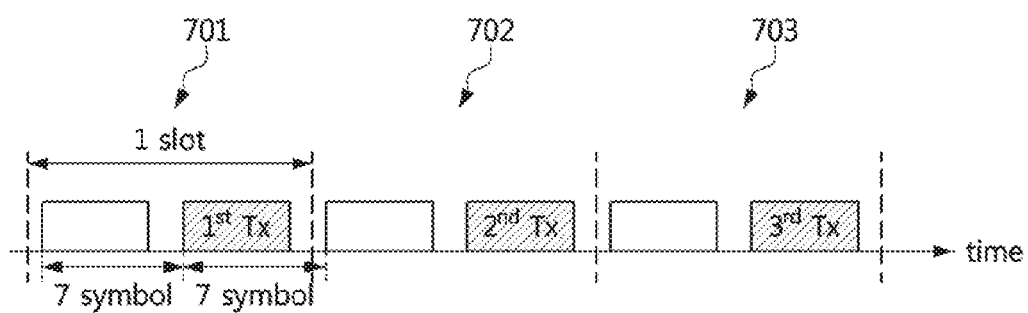
FIG. 7 is a conceptual diagram illustrating an example in which an SR having a repeated transmission period of 7 symbols is allowed to be transmitted only once in one slot.
Figure 8:
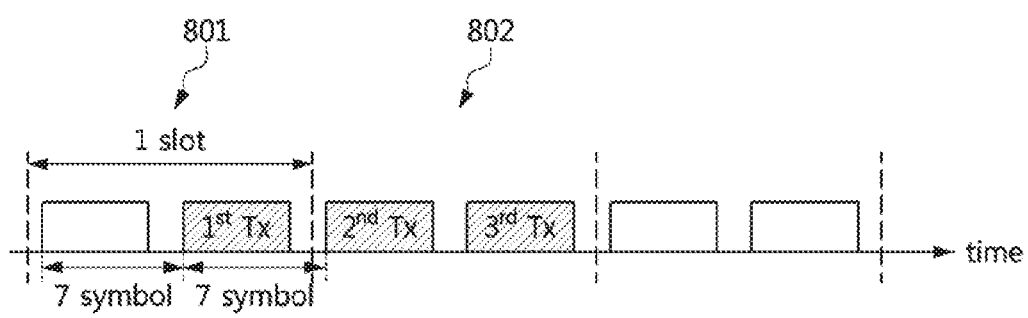
FIG. 8 is a conceptual diagram illustrating an example in which an SR having a repeated transmission period of 7 symbols is allowed to be transmitted once or twice in one slot.

A case where the repeated transmission periodicity of the SR is composed of 2 symbols or 7 symbols shorter than the length of one slot may be considered. In the case that 2 UL symbols are provided as the repeated transmission periodicity, it may be considered that the number of symbols occupied by the SR is 1 or 2. In the case that 7 UL symbols are provided as the repeated transmission periodicity, the SR may be transmitted once or twice in one slot when the number of symbols occupied by the SR is 4, 5, 6 or 7. FIGS. 7 and 8 show a method of repeatedly transmitting SR in the case where the terminal transmits the SR by using 7 UL symbols as the repeated transmission periodicity. In FIGS. 7 and 8, it is assumed that the transmission is repeated three times, but the embodiments of the present disclosure are not limited thereto. It may be assumed that the length of the UL interval of the slot is equal to or greater than the length of the UL control channel including the SR and the UL interval has the same starting symbol for each slot. Otherwise, the terminal may not transmit the UL control channel in the corresponding slot.

FIG. 7 is a conceptual diagram illustrating an example in which an SR having a repeated transmission periodicity of 7 symbols is allowed to be transmitted only once in one slot.

In a proposed method, when the SR transmission is allowed up to once in one slot, the terminal may perform the SR transmission three times by using 3 slots 701, 702, and 703. When the terminal repeatedly transmits not SR but CSI or HARQ-ACK K times, the terminal may perform the transmissions in K consecutive slots. In this case, the symbols of the UL control channel, which are used for the transmissions, should be the same for the respective slots. Therefore, the starting symbol of the UL control channel and the number of symbols constituting the UL control channel may be equal in each slot. When the SR is repeatedly transmitted, the SR may be transmitted in the same symbols for each slot. In this case, when the terminal transmits the SR by multiplexing CSI or HARQ-ACK with the SR, the same multiplexing rule may be applied to each slot.

FIG. 8 is a conceptual diagram illustrating an example in which an SR having a repeated transmission periodicity of 7 symbols is allowed to be transmitted once or twice in one slot.

In another proposed method, when the SR transmission is allowed 2 or more times in one slot, the terminal may perform the SR transmission three times by using 2 slots 801 and 802. Since the case of configuring the repeated transmission periodicity of the SR to 7 symbols corresponds to the low-latency case, in order to support this, the terminal may transmit the SR in resources adjacent to each other. In this case, it is possible to complete the repeated transmissions of SR more quickly. However, when multiplexing the SR and CSI or HARQ-ACK and transmitting the SR, different SRs may be transmitted in different symbols for each slot, and thus a different multiplexing rule may be applied to each slot.

Figure 9:
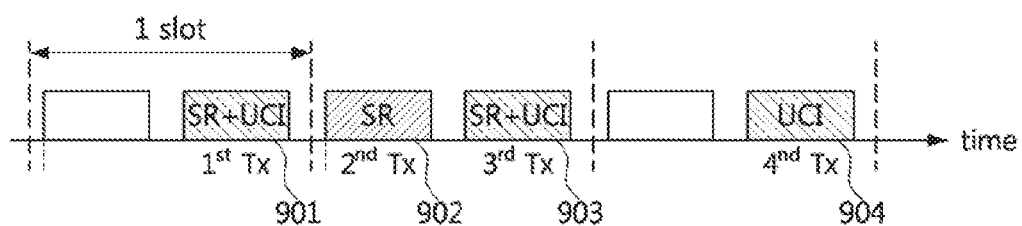
FIG. 9 is a conceptual diagram illustrating multiplexing of SR and UCI when an uplink control channel is repeatedly transmitted.

FIG. 9 is a conceptual diagram illustrating multiplexing of SR and UCI when an uplink control channel is repeatedly transmitted.

As shown in FIG. 9, a case where UCI other than SR is repeatedly transmitted three times and SR is repeatedly transmitted three times may be considered. In the first transmission 901 and the third transmission 903, symbols of the UL control channel for the SR and symbols of the UL control channel for the UCI other than the SR overlap partially or completely, and thus the serving base station may configure the terminal to transmit the UL control channels by using resources for multiplexing of UCI and SR. In case of the second transmission 902, since the UL control channel for the UCI and the UL control channel for the SR are not transmitted in the same UL symbols, the terminal may transmit only the SR. In case of the fourth transmission 904, since the three repeated transmissions of the SR have already been completed, the terminal may transmit only the UCI. The transmission power applied by the terminal to the first transmission 901 and the third transmission 903, the transmission power applied to the second transmission 902, and the transmission power applied to the fourth transmission 904 may be different.

Meanwhile, even when a slot corresponds to a given period, there may be a case where the format of the slot cannot transmit the UL control channel including the SR. In this case, the terminal may transmit the SR only in a slot in which the UL control channel can be transmitted. Even when the SR is repeatedly transmitted by the terminal at the repeated transmission period of 7 symbols in the proposed methods, the SR may be transmitted only in a slot in which the SR can be transmitted. For example, in case of a UL slot, the SR can be repeatedly transmitted twice. However, in case of a UL-centric slot or a DL-centric slot, the SR cannot be transmitted at all or can be transmitted only once according to a starting position of UL symbols in the corresponding slot. In this case, the terminal may count the number of repeated transmissions only by the number of times the SR is actually transmitted.

A method of repeatedly transmitting an SR with a small number of symbols and a method of configuring the number of symbols of the SR to be large may not have a large difference in terms of the UL coverage and the reception quality at the serving base station. However, in a dynamic TDD scenario, if a slot format changes frequently, it may happen that an SR having a large number of symbols cannot be transmitted. In this case, when a small number of symbols are used, the number of cases in which an SR can be transmitted may increase. For example, it may be more preferable to transmit an SR composed of 6 symbols twice, rather than transmitting an SR composed of 12 symbols once.

(3) Frequency Hopping Scheme for the Case of Transmitting SR More than Twice in One Slot The parameters configured to the terminal by the serving base station through upper layer signaling may include a repeated transmission periodicity of SR resource and whether a frequency hopping is performed within a slot while transmitting SR or whether a frequency hopping is performed only at a slot boundary while transmitting SR. The terminal may repeatedly transmit SR twice or more in one slot only when the period of SR resource ('SR-periodicity' in the NR TS) is 7 symbols or less. Through upper layer signaling ('PUCCH-frequency-hopping' in the NR TS), the serving base station may configure whether the terminal performs the frequency hopping or not within a slot while the terminal transmits the SR. If the terminal repeatedly transmits SR twice or more ('PUCCH-F1-number-of-slots' or 'nrofslots' in the NR TS), the terminal may be configured to perform a frequency hopping within a slot ('PUCCH-frequency-hopping' in the NR TS), or may be configured to perform a frequency hopping not within a slot but at a slot boundary ('PUCCCH-F1-F3-F4-interslot-FH' in the NR TS) through upper layer signaling. When the terminal is configured to perform the frequency hopping, two frequencies ('PUCCH-starting-PRB' and 'PUCCH-2nd-hop-PRB' in the NR TS) may be configured to the terminal by the serving base station through upper layer signaling.

Figure 10:
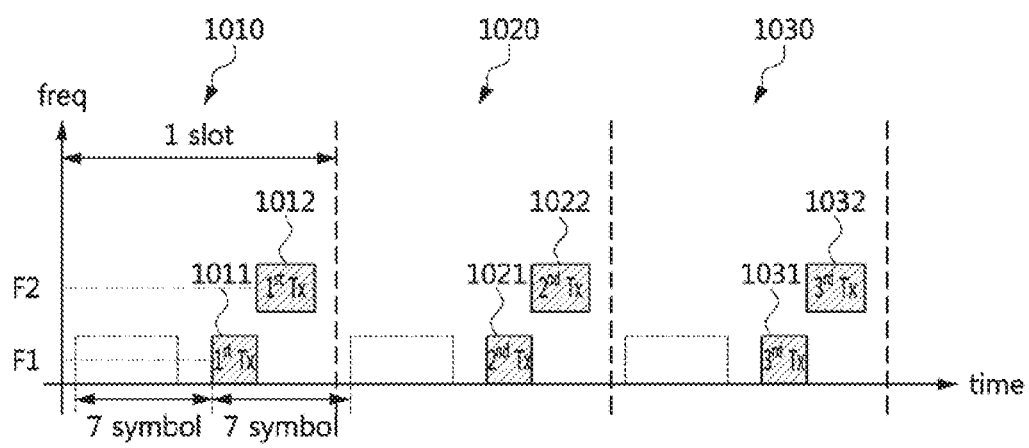
FIG. 10 is a conceptual diagram illustrating a conventional SR repetition and a conventional intra-slot frequency hopping.

FIG. 10 is a conceptual diagram illustrating a conventional SR repetition and a conventional intra-slot frequency hopping.

According to the conventional technique, if the terminal performs frequency hopping for the SR within a slot 1010, the terminal may transmit a first hop 1011 of the SR at a frequency F1 and transmit a second hop 1012 of the SR at a frequency F2. FIG. 10 illustrates the case of transmitting the SR three times. The SR is repeatedly transmitted three times using three slots 1010, 1020 and 1030. The terminal may transmit the SR at the frequencies F1 and F2 also in case of the second transmission (i.e., 1021, 1022) of the SR and the third transmission (i.e., 1031, 1032) of the SR.

Figure 11:
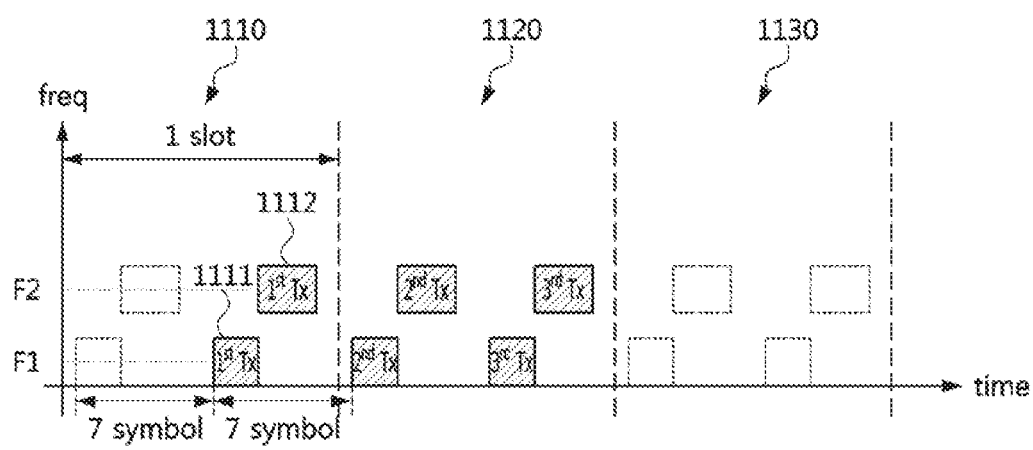
FIG. 11 is a conceptual diagram illustrating a proposed SR repetition and a conventional intra-slot frequency hopping.

FIG. 11 is a conceptual diagram illustrating a proposed SR repetition and a conventional intra-slot frequency hopping.

In a proposed method, when the terminal repeatedly transmits SR and the repeated transmission periodicity of the SR is 7 symbols, the terminal may transmit the SR twice in one slot 1110. FIG. 11 illustrates the case of transmitting the SR three times. The SR is repeatedly transmitted three times using two slots 1110 and 1120. When the terminal performs a frequency hopping within a slot, the frequency resources used in the first transmission may be used also in the second transmission and the third transmission.

Figure 12:
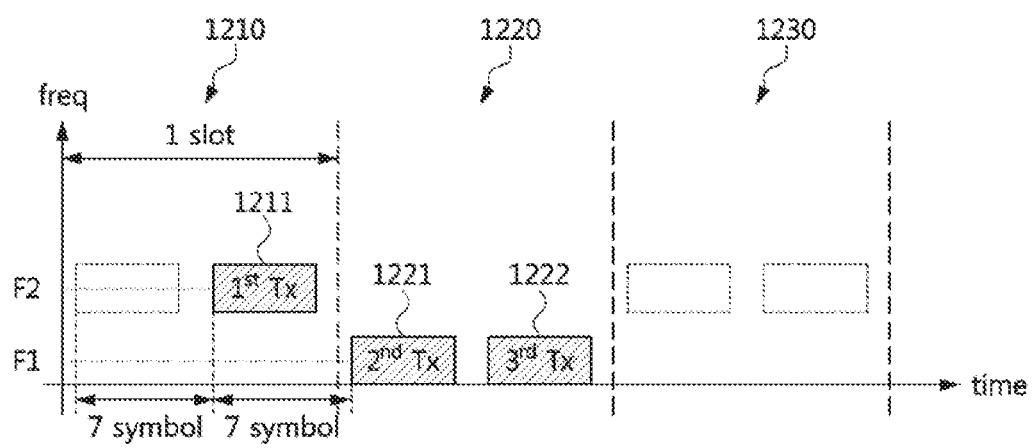
FIG. 12 is a conceptual diagram illustrating a proposed SR repetition and a conventional inter-slot frequency hopping.

FIG. 12 is a conceptual diagram illustrating a proposed SR repetition and a conventional inter-slot frequency hopping.

In case that the number (i.e., D) of symbols that the SR has is one of 2, 4, 5, 6, and 7, the number of symbols in each frequency hop may correspond to ($\lfloor D/2 \rfloor$, $\lceil D/2 \rceil$), and accordingly a reception error rate at the serving base station may be high when the terminal performs frequency hopping while transmitting the SR. In order to further reduce the reception error rate, the SR may be repeatedly transmitted, but a frequency hopping may not be performed during the transmission of the SR. When the conventional scheme is applied, frequency hopping may be performed only at the slot boundary while repeatedly transmitting the SR. This is shown in FIG. 12. The SR is repeatedly transmitted three times using two slots. Since the terminal performs frequency hopping only at the slot boundary, the frequency resources used in the second transmission and the third transmission are the same, and the frequency resource used in the first transmission is different from those. The terminal may apply the frequency resources configured by the serving base station differently according to whether a slot index has an odd number or an even number.

Figure 13:
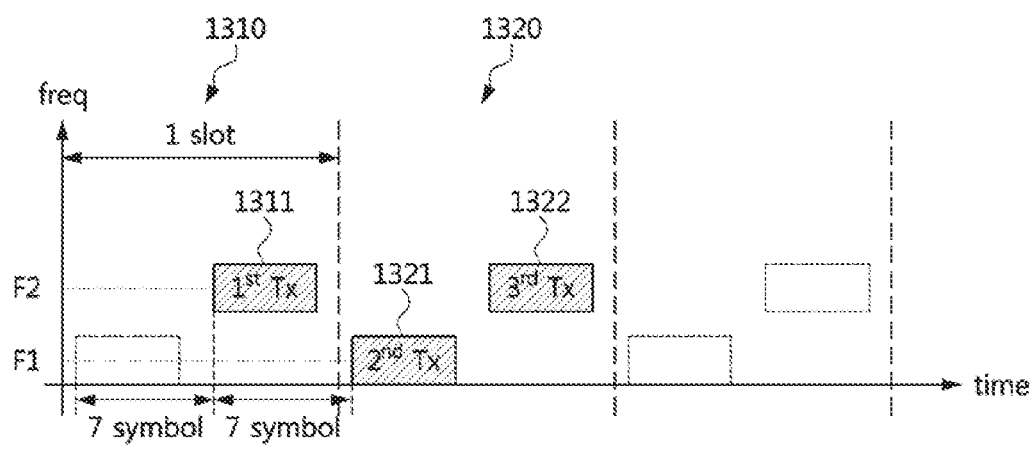
FIG. 13 is a conceptual diagram illustrating a proposed SR repetition and a proposed inter-slot frequency hopping.

FIG. 13 is a conceptual diagram illustrating a proposed SR repetition and a proposed inter-slot frequency hopping.

In a proposed frequency hopping scheme, frequency hopping for SR may be performed not at a slot boundary but at a half-slot boundary. When the SR is repeatedly transmitted three times using two slots 1310 and 1320, frequency hopping may be performed after the first transmission 1311 of the SR. A frequency resource applied by the terminal may have not a slot unit but a half-slot unit, and a different frequency resource may be applied according to whether an index of the corresponding half-slot is an odd number or an even number. For example, if a transmission resource is located in the first half-slot, it may be regarded as an even-numbered transmission and a first frequency resource is applied. On the other hand, if a transmission is located in the second half-slot, it may be regarded as an odd-numbered transmission and a second frequency resource is applied.

In a proposed method, when the SR is repeatedly transmitted twice, the frequency multiplexing gain can be obtained when the terminal starts transmission of the SR at the beginning of the slot. Since the terminal performs frequency hopping while transmitting the SR in the front part of the slot and the rear part of the slot, the terminal may transmit the SR at at least two frequencies. On the other hand, according to the conventional method of performing frequency hopping only at the slot boundary, only a single frequency is used even when the SR is repeated twice.

(4) Repeated SR Multiplexing

Figure 14A:
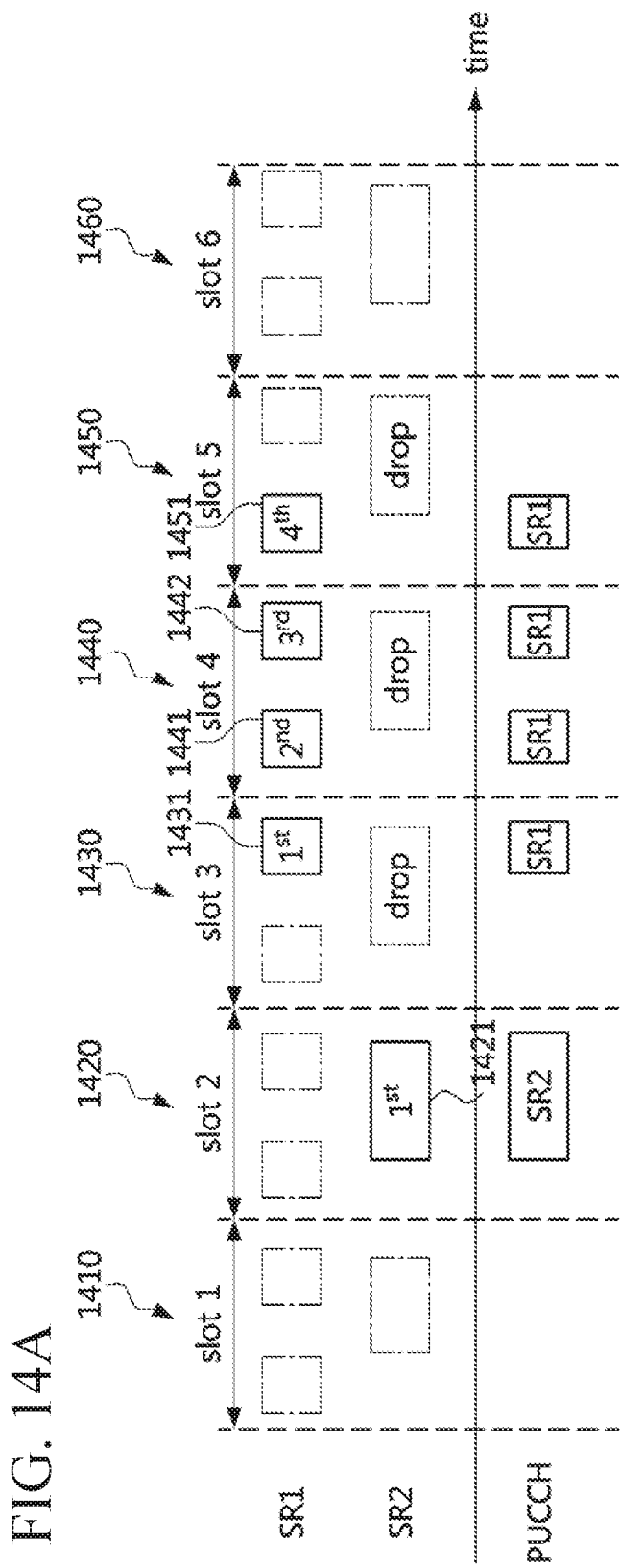
FIGS. 14A and 14B are conceptual diagrams illustrating an example in which priorities are applied while repeatedly transmitting two different SRs.
Figure 14B:
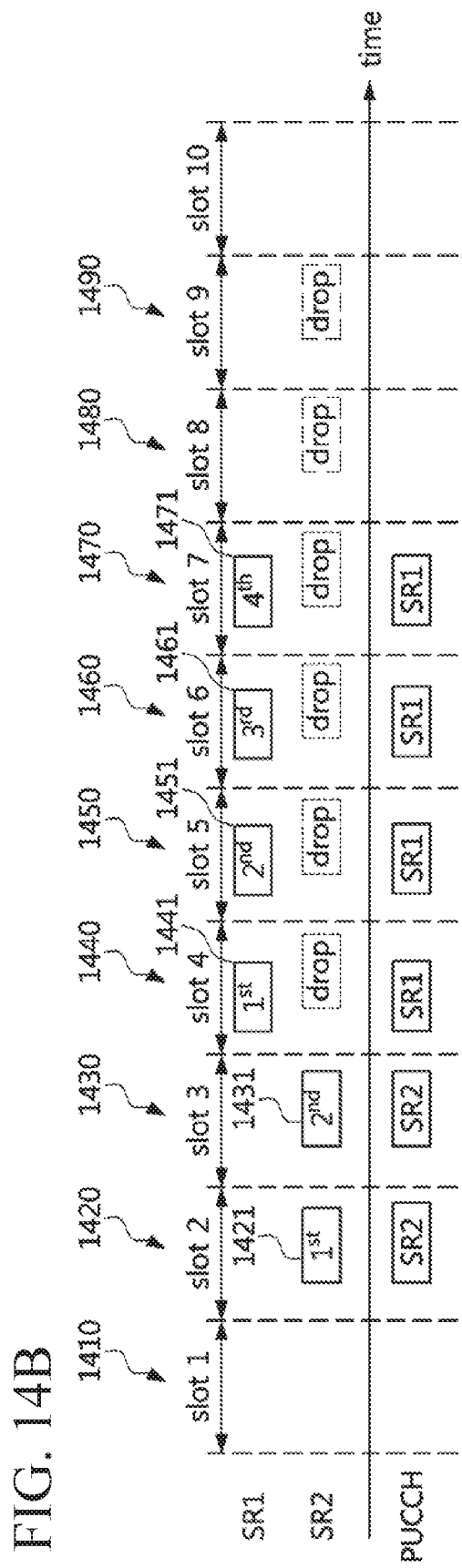

FIGS. 14A and 14B are conceptual diagrams illustrating an example in which priorities are applied while repeatedly transmitting two different SRs.

Two or more SR resources may be configured to the terminal by the serving base station through upper layer signaling, and the terminal may be configured to repeatedly transmit different SRs by the serving base station through upper layer signaling. When the UL control channel for the first SR and the UL control channel for the second SR overlap with each other in some symbols, the terminal may compare priorities of the SRs determined by the upper layer, select one SR according to the priorities, and transmit the selected SR to the serving base station. For example, a case where a first SR is transmitted K times and a second SR is transmitted K times may be considered. FIG. 14A shows a case where K=4. FIG. 14A shows a case where the first SR can be transmitted twice in one slot, but the embodiments of the present disclosure are not limited thereto. As shown in FIG. 14B, the first SR may be transmitted only once (shown as 1441, 1451, 1461 and 1471) in one slot 1440, 1450, 1460 or 1470. In a proposed method, if the first SR is being transmitted prior to the second SR and the first SR has a higher priority, the terminal may transmit the first SR and not the second SR (i.e., the second SR may be dropped). Thereafter, according to the proposed method, the terminal may transmit the second SR less than K times in order to transmit the first SR, but the terminal may not transmit the second SR any more.

The serving base station receives the first SR from the terminal and recognizes that the terminal has received another type of traffic. Therefore, the serving base station may allocate a UL data channel to the terminal by transmitting a DL control channel, and thus be informed of a new state of buffer by the terminal. In this case, the serving base station may identify not only the amount of traffic for the second SR but also the amount of traffic for the first SR. Therefore, even if the terminal has not sufficiently transmitted the second SR, the terminal may not transmit the second SR any more since the terminal has repeatedly transmitted the first SR by the set number of times.

In FIG. 14A, the second SR is transmitted only once 1421 in a slot 1420, and the first SR is transmitted four times 1431, 1441, 1442 and 1451 in slots 1430, 1440 and 1450. A plurality of SRs may be configured to the MAC layer of the terminal, and the MAC layer of the terminal may deliver an SR having a higher priority to the PHY layer, and may not deliver an SR having a lower priority to the PHY layer during transmission on a UL control channel corresponding to the first SR having a higher priority. However, in case that the MAC layer of the terminal delivered the second SR having a lower priority to the PHY layer, the MAC layer of the terminal may deliver the first SR having a higher priority to the PHY layer even while transmitting a UL control channel corresponding to the second SR. The terminal may transmit the first SR to the serving base station using a UL control channel. In this case, the MAC layer of the terminal may decrease a value of SR_COUNTER corresponding to the second SR, which has not been transmitted once, by 1. Since the terminal did not transmit the second SR in some slots, the value of SR_COUNTER which counts the number of repeated transmissions of the second SR may be adjusted again.

According to another proposed method, the repeated transmissions of the second SR may be performed using resources for the second SR after the transmission of the first SR. As a result, repeated transmissions for the second SR may also be performed from the first transmission to the K-th transmission. In this case, there is a need for a method in which the serving base station utilizes the second SR that the terminal has already transmitted to the serving base station in the slot 1420.

Figure 15A:
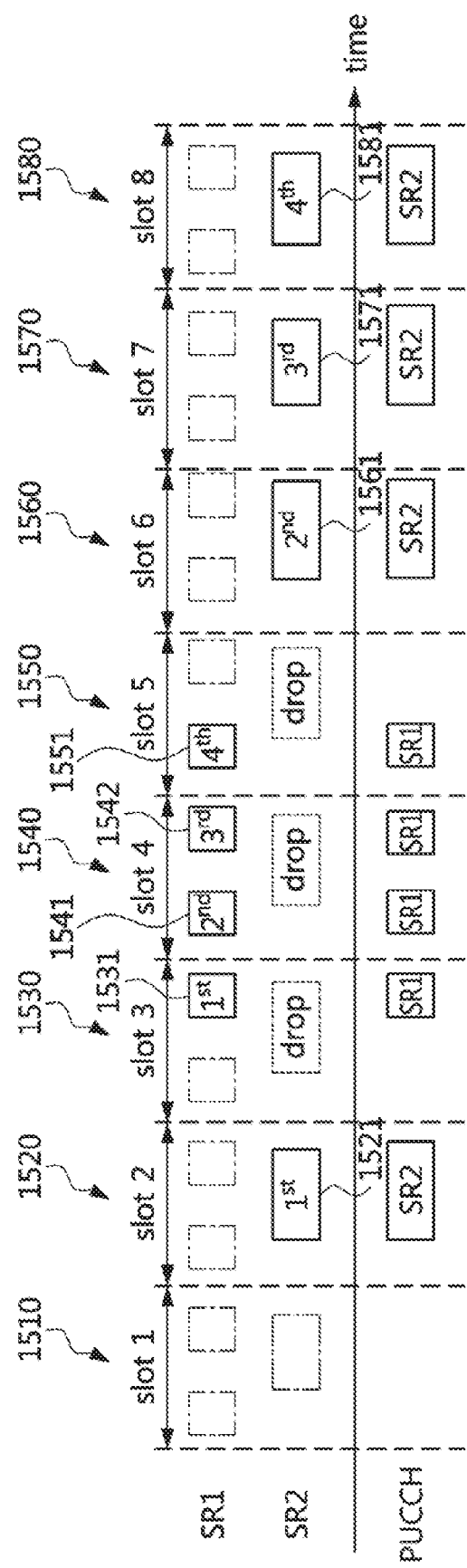
FIGS. 15A and 15B are conceptual diagrams illustrating another example in which priorities are applied while repeatedly transmitting two different SRs.
Figure 15B:
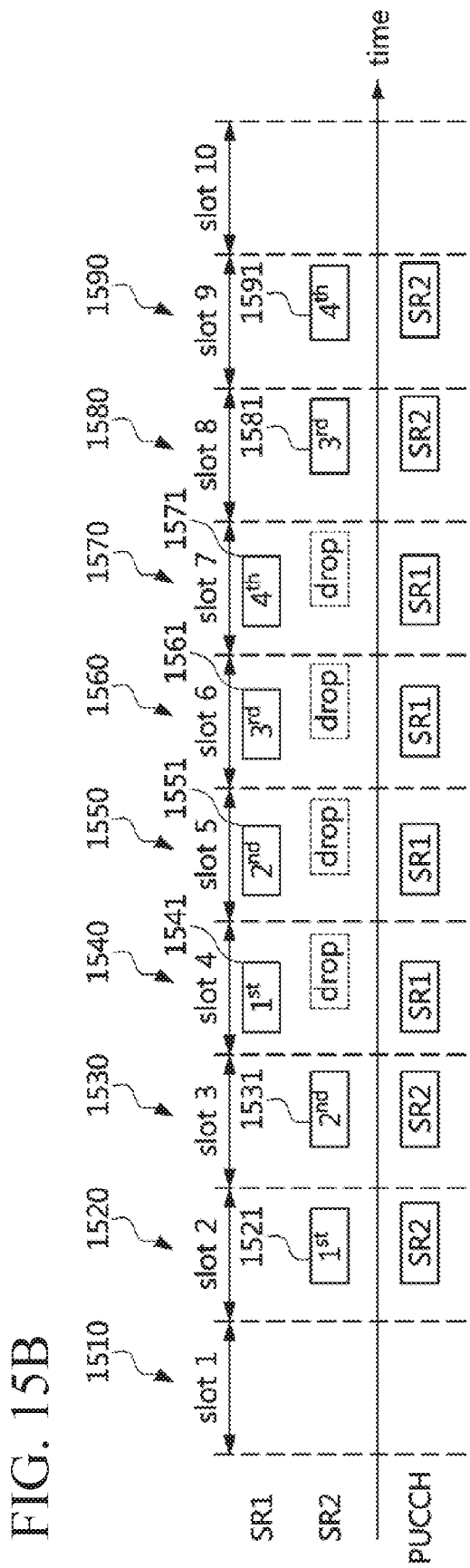

FIGS. 15A and 15B are conceptual diagrams illustrating another example in which priorities are applied while repeatedly transmitting two different SRs.

In another proposed method, the terminal may transmit only the first SR consecutively after transmitting the second SR one time, and then transmit the second SR consecutively. The terminal transmits the second SR in the slot in which the second SR can be transmitted. In FIG. 15A, the second SR is transmitted one time 1521 in a slot 1520, the first SR is repeatedly transmitted four times 1531, 1541, 1542, and 1551 in slots 1530, 1540, and 1550, and then the second SR is repeatedly transmitted three times 1561, 1571, and 1581 in the slots 1560, 1570, and 1580. In this case, when the second SR is transmitted four times, it is not transmitted in consecutive slots, and the serving base station may guess the slots in which the second SR is received. FIG. 15A shows that the first SR is transmitted twice in one slot, but the embodiments of the present disclosure are not limited thereto. That is, the terminal may transmit the SR only once in one slot as shown in FIG. 15B.

For the UL control channels transmitting the SR configured to the terminal, the serving base station may combine the UL control channels received in the consecutive slots. Assuming that the SR can be received in K slots which can start from any slot, the serving base station may perform the combining for the first SR in the slots (1,2), and then perform the combining in the slots (2,3). The same rule may be repeated in the respective slots. Also, the serving base station may perform the combining for the second SR in the slots (1,2,3,4), and then perform the combining in the slots (2,3,4,5). The same rule may be repeated in the respective slots. Since the first SR has a higher priority than the second SR, the serving base station may perform the combining by assuming the candidate slots in which the second SR can be transmitted to be not only the slots (1,2,3,4) but also the slots (1,4,5,6), the slots (1,2,5,6) or the slot (1,2,3,6), and repeat the same rule in the respective slots. FIG. 15A may correspond to an example in which the serving base station combines the first SR in the slots (3,4,5) and the second SR in the slots (2,6,7,8).

As in the above-proposed method, the serving base station may receive the first SR from the terminal, and may be informed a new state of the buffer from the terminal by transmitting a DL control channel. However, the serving base station may not instruct the terminal to report the new state of the buffer. In this case, as another proposed method, the terminal may repeatedly transmit the SRs the number of times configured by the serving base station through upper layer signaling by transmitting the first SR and the second SR without distinguishing the first SR and the second SR. In this case, it may not be necessary to separately adjust the SR_COUNTER for the first SR and the SR_COUNTER for the second SR in the MAC layer of the terminal.

(5) Payload Change (UCI Repetition)

Next, consider a case where the terminal transmits not only SR but also HARQ-ACK or CSI. The terminal does not distinguish UCI transmitted through a UL control channel by parts (types) of the UCI, but may select a set of resources used by the UL control channel only by the total amount of the UCI bits.

In case of SR, periodic CSI, semi-persistent CSI, or HARQ ACK for a semi-persistently allocated DL data channel among UCI types, the serving base station may configure a resource through which the UL control channel is transmitted by the terminal through upper layer signaling. In case of HARQ-ACK for a dynamically allocated DL data channel among UCI types, the serving base station may use a PRI included in the DL control channel, or may use the PRI and other information derived from the DL control channel to indicate a resource through which the UL control channel is transmitted in the terminal.

In order to widen the coverage of the UL control channel, the serving base station may configure the terminal to repeatedly transmit the UL control channel through upper layer signaling. The serving base station may configure the number of repeated transmissions to be different for each format of the UL control channel. For example, the number of repeated transmissions for each of the formats 1, 3 or 4 may be different.

Figure 16:
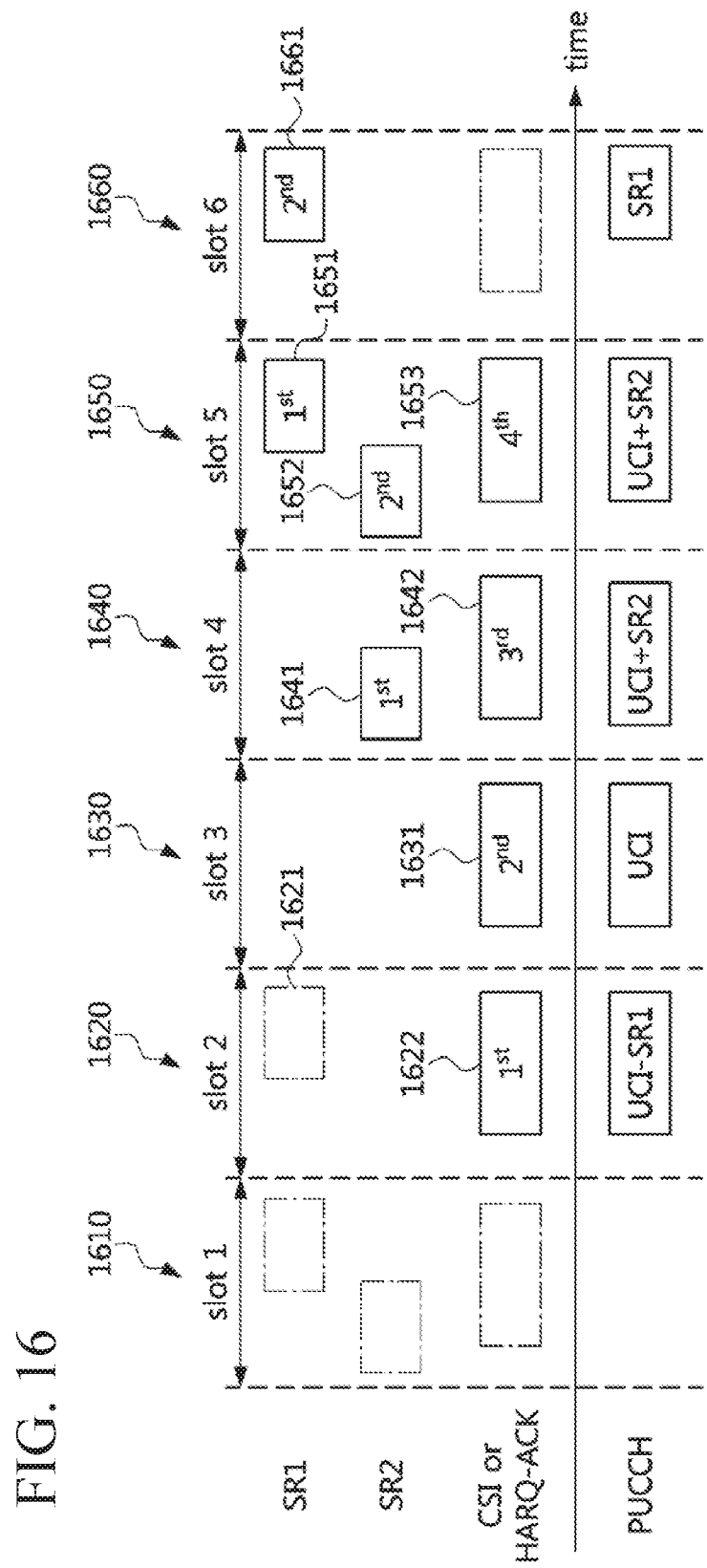
FIG. 16 is a conceptual diagram illustrating an example (counter sustain) in which priorities are applied while repeatedly transmitting two SRs and CSI or HARQ-ACK.
Figure 17:
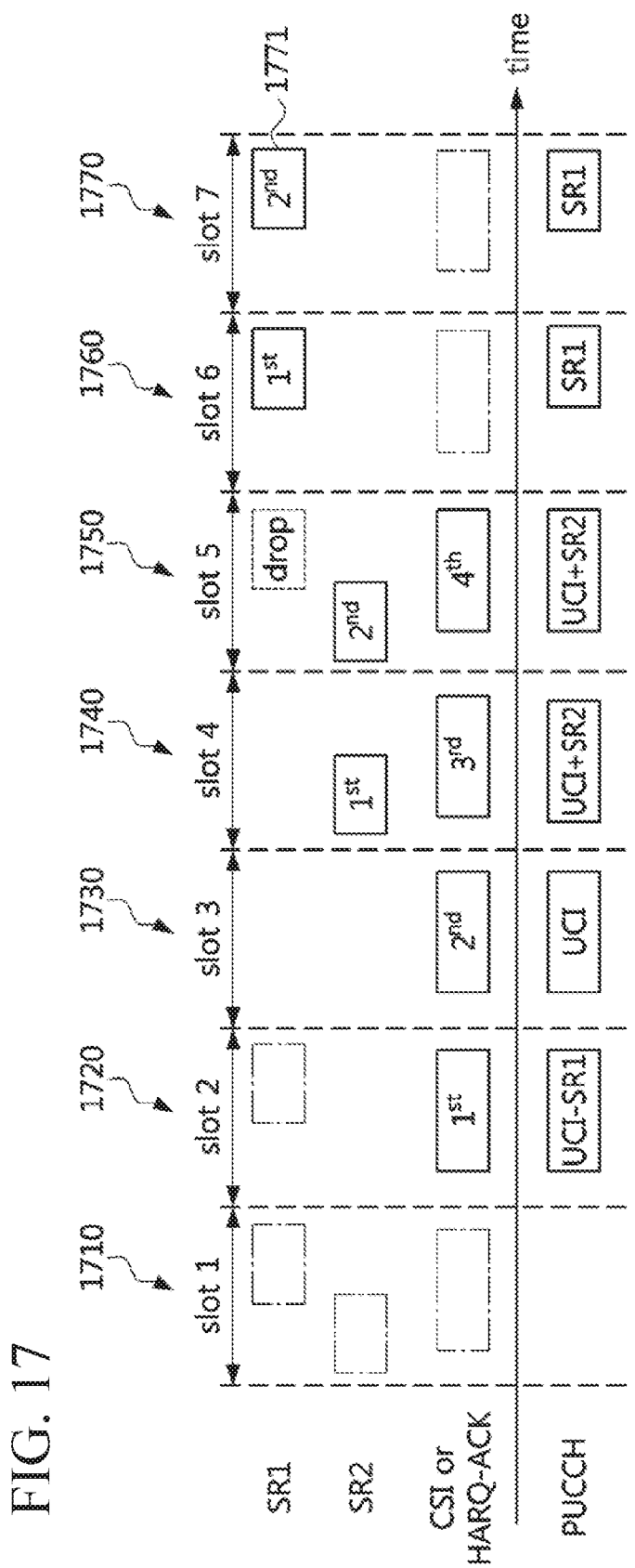
FIG. 17 is a conceptual diagram illustrating an example (counter reset) in which priorities are applied while repeatedly transmitting two SRs and CSI or HARQ-ACK.

FIG. 16 is a conceptual diagram illustrating an example (counter sustain) in which priorities are applied while repeatedly transmitting two SRs and CSI or HARQ-ACK, and FIG. 17 is a conceptual diagram illustrating an example (counter reset) in which priorities are applied while repeatedly transmitting two SRs and CSI or HARQ-ACK.

FIGS. 16 and 17 illustrate a case where two or more SRs and other UCI type are multiplexed and transmitted. For example, it is assumed that the terminal is configured by the serving base station to repeatedly transmit each SR twice in the UL control channel format 1. It is also assumed that the terminal is configured by the serving base station to repeatedly transmit other UCI type four times in the UL control channel format 3 or format 4. In this case, the number of bits corresponding to other UCI type may be represented by Z bits ($Z \geq 3$). The terminal may map CSI or HARQ-ACK to the UL control channel by using the format 3 or 4 in the slots 2, 3, 4 and 5.

Since a first SR resource 1621 is present in the slot 1620 but the first SR does not occur, the terminal may encode a negative SR representing that the first SR does not occur as 1 bit, and transmit the negative SR by appending it to the already-encoded other UCI type 1622 and mapping them to the UL control channel.

Since a SR resource does not occur in the slot 1630, the terminal may transmit only the already-encoded other UCI type by mapping the already-encoded other UCI type to the UL control channel 1631.

Since a second SR resource 1621 is present in the slot 1640 and the second SR occurs, the terminal may encode a positive SR representing that the second SR occurs as 1 bit 1641, and append it to the already-encoded other UCI type 1642 and map them to the UL control channel.

In the slot 1650, both the first SR resource and the second SR resource occur. Thus, a case where both the first SR and the second SR do not occur (negative SR1, negative SR2), a case where the first SR occurs but the second SR does not occur (positive SR1, negative SR2), a case where the first SR does not occur but the second SR occurs (negative SR1, positive SR2), and a case where both the first SR and the second SR occur (positive SR1, positive SR2) should be represented. According to priorities of the cases, only the three cases including the case where all the SRs do not occur, the case whether the first SR occurs but the second SR does not occur, and the case where only the second SR occurs may be represented by using 2 bits as shown in 1651 and 1652, and the 2 bits may be appended to the already-encoded other UCI type 1653 and mapped to the UL control channel. In the slot 1650, although the first SR occurs in the terminal, only the second SR is transmitted to the serving base station according to the priorities, the serving base station may not know whether or not the first SR occurs in the terminal.

In the slot 1660, since no other UCI type is transmitted, only the first SR 1661 is transmitted through the UL control channel, which may correspond to that the terminal transmits the first SR first time.

Meanwhile, in the following slot 1670 (not shown), an operation of the terminal may be classified into two types. In case of FIG. 16, the terminal may not transmit the SR that could not be transmitted due to a low priority later. After transferring to the PHY layer is started, the number of transmissions of the SR may be counted by including the number of failures due to the priority. In this case, the terminal may transmit the first SR only once. On the other hand, in case of FIG. 17, the terminal may transmit the SR (e.g., the first SR 1771) that could not be transmitted due to a low priority in the slot 1670. After delivering to the PHY layer, the number of transmissions of the SR may be counted by not including the number of failures due to the priority, and thus only the first SR may be transmitted through the UL control channel. In this case, the terminal may transmit the first SR two times.

In the examples of FIGS. 16 and 17, the terminal may transmits (Z+1) bits in the slot 2, Z bits in the slot 3, (Z+1) bits in the slot 4, and (Z+2) bits in the slot 5. The number of bits of the UL control channel may change for each slot in which the terminal transmits the other UCI type to the serving base station. Therefore, the method of maintaining the same transmission power level while the terminal repeatedly transmits the UL control channel is not suitable because the number of bits of the UCI changes. In order to simplify a reception procedure of the serving base station, it may be preferable that a time resource, a frequency resource, a sequence resource, and a transmission power of the UL control channel are kept the same even if the slot is changed.

In a proposed method, since the amount of UCI may vary from slot to slot as described above, even if two or more SRs are configured to the terminal, the amount of UCI may always be fixed to the maximum to maintain the amount of UCI. For example, when L SRs are configured to the terminal, (L+1) states may be represented by using $\lceil \log_2(1-L) \rceil$ bits, and the bits may be always appended to the other UCI type and mapped to the UL control channel. In this manner, the time resource, the frequency resource, the sequence resource, the transmission power, and the transmission format of the UL control channel may be kept the same while the terminal repeatedly transmits the UL control channel.

In another proposed method, in the process of calculating the number of bits of the UCI, the terminal may determine a resource set by only the other UCI type except the SR. The time resource, the frequency resource, the sequence resource, the transmission power, and the transmission format of the UL control channel may be allowed to vary in each slot. However, the set including the resources of the UL control channel selected by the terminal may be kept the same while repeatedly transmitting the UL control channel. As shown in FIG. 3, in the case that the terminal transmits UCI bits near the boundary between $N_2$ and $N_3$ for determining a resource set for the UL control channel, if two or more SRs are configured to the terminal, a different set may be selected for each slot for transmitting the UL control channel to the serving base station, and the time resource, the frequency resource, the sequence resource, the transmission power, and the transmission format of the UL control channel may differ from slot to slot. Applying the proposed method, since the terminal determines the resource set by only bits excluding the SR in the UCI type while satisfying the condition for the maximum coding rate set by the serving base station, the same resource set may be selected regardless of the configuration of the time resources of the SR while repeatedly transmitting the UL control channel. The time resource, the frequency resource, the sequence resource, and the transmission format may be kept the same while the terminal repeatedly transmits the UL control channel. However, since the number of bits of the UCI may change from slot to slot, the terminal may control the transmission power for each slot.

(6) Counting Repeated Transmissions

When the UCI is repeatedly transmitted, the serving base station may configure the number of repetitions for each format differently to the terminal through upper layer signaling. In this case, a method for counting the number of repetitions is necessary when UCI types occur differently and overlap each other. A method proposed below may be applied to each of the methods described above.

In a proposed method, the number of repeated transmissions per UCI type may be separately applied to the terminal irrespective of the format. Since a specific UCI type should be transmitted in a specific format, the number of repeated transmissions of the specific UCI type may be determined by the number of repeated transmissions of the corresponding format. Alternatively, the number of repeated transmissions of a specific UCI type may have the same number of times regardless of its format. That is, the serving base station may configure one value to the terminal through upper layer signaling, and the terminal may repeatedly transmit the UL control channel by the number of times corresponding to the value. Therefore, when the proposed method is applied, when the UCI is repeatedly transmitted, the number of times each UCI is transmitted may be counted.

If the terminal transmits only the SR, the terminal should use the format 0 or 1. The number of times of repeatedly transmitting the format 0 or the number of times of repeatedly transmitting the format 1 may be regarded as the number of times of transmitting the SR. The serving base station may configure the number of times of transmitting the SR differently according to the format or may configure the number of times of transmitting the SR equally regardless of the format. Alternatively, the number of transmission times may be configured to the terminal and applied to all formats for transmitting the SR. If the terminal multiplexes and transmits the SR and other UCI type(s) to the serving base station in a format other than the format 1, the number of times for all transmitted formats may be counted as the number of transmissions of the SR.

In a proposed method, in the case that only the SR is repeatedly transmitted, if only one SR is transmitted without transmitting other SR according to the priorities of two or more SRs, only a case when the SR is transmitted may be counted as the transmission of the SR. For example, if a SR cannot be transmitted in some slots, the terminal may still further transmit the SR.

Meanwhile, in another proposed method, since the SR having a higher priority is already transmitted to the serving base station when the SR having a lower priority is not transmitted, even if the terminal could not transmit a part of the SRs repetitions having a lower priority, the terminal may not transmit the corresponding SR the remaining times. In this case, the number of transmissions of the SR having a lower priority may not be counted any more.

If the terminal transmits only HARQ-ACK of 3 bits or more, or transmits only CSI, the format 3 or 4 should be used. A case in which the terminal repeatedly transmits the HARQ-ACK by appending the CSI to the HARQ-ACK may be considered. Conversely, a case in which the terminal repeatedly transmits the CSI by appending the HARQ-ACK to the CSI may be considered. In this case, even if the terminal performs the transmission while changing the format during the repeated processes, the number of transmissions of the HARQ-ACK or the CSI may be counted for all the formats.

Also, when terminal transmits the HARQ-ACK, the CSI, or the SR, the UL control channel may have a different resource each time it is repeatedly transmitted. In this case, the number of times that the HARQ-ACK, the CSI or the SR is transmitted may be counted for all resources.

(7) Multiplexing of HARQ-ACK for DL SPS

A case where a DL data channel is transmitted based on a semi-persistent scheduling (SPS) allocation may be considered. The serving base station may allocate a DL data channel resource (e.g., time resource and frequency resource according to a periodicity) to the terminal through upper layer signaling, and then activate or deactivate it by using a DL control channel.

The terminal may generate an HARQ-ACK bit for the DL data channel, and transmit a UL control channel including the HARQ-ACK bit in a slot defined through upper layer signaling. Here, a format, number of symbols, and a starting symbol position of the UL control channel may be determined based on information that the serving base station configures to the terminal through upper layer signaling.

According to the technical specification (e.g., the NR TS), a rule for multiplexing the UL control channel and the UL data channel is defined. For convenience of explanation, a UL control channel including an HARQ-ACK derived from a DL data channel by a SPS may be represented as a 'UL control channel 1', and a symbol at which transmission of the UL control channel 1 is started may be represented as a 'symbol 1'. A UL physical channel for transmitting other UCI or UL data may be represented as a 'UL control channel 2' or a 'UL data channel 2', and a symbol at which transmission of the UL physical channel is started may be represented as a 'symbol 2'.

When the symbol 1 and the symbol 2 are identical, the terminal may not transmit the UL control channel 1 and the UL physical channel for transmitting the UCI or UL data separately, but may generate one UL physical channel. For example, without transmitting the UL control channel 1, the terminal may map only the UCI of the UL control channel 1 to the UL control channel 2 or the UL data channel 2. In case of the UL control channel 2, the terminal may encode the UCI of the UL control channel 1 together with the UCI of the UL control channel 2. In case of the UL data channel 2, the UL data channel 2 may include the UCI of the UL control channel 1.

In a proposed method, if the UCI constituting the UL control channel 1 corresponds to the DL data channel by the SPS described above, regardless of the symbol 1 and the symbol 2, the terminal may transmit the UCI to the serving base station by including the UCI in one UL physical channel transmitted in the corresponding slot.

For example, if only one UL physical channel is allocated in the corresponding slot, the terminal may map the UCI to the UL physical channel. However, when there are two or more UL physical channels, the terminal may include the UCI in the UL physical channel transmitted first or last among them because the UL physical channels are time division multiplexed (TDM).

Preferential Traffic Handling

The terminal may be configured to transmit to two or more traffics (e.g., eMBB traffic and URLLC traffic) to the serving base station through upper layer signaling. The traffics may be classified according to a logical channel group identifier (LCGI) and may have different error rates or different latency requirements. For convenience of explanation, a traffic having a lower error rate and a shorter latency may be referred to as a 'traffic #1', and a traffic having a higher error rate and a longer latency may be referred to as a 'traffic #2'.

The serving base station may allocate a resource of a UL data channel to the terminal by using a DL control channel. The DL control channel may include a time resource, a frequency resource, a reference signal related parameter, a modulation order, and a coding rate that the UL data channel should use. The serving base station may transmit a DL control channel #1 to the terminal so that the terminal transmits the traffic #1, and may transmit a DL data channel #2 to the terminal so that the terminal transmits the traffic #2. After generating the traffic #1 or the traffic #2, the terminal may request scheduling to the serving base station, and report a buffer state when necessary according to an indication of the serving base station. A UL control channel #1 requesting scheduling for the traffic #1 and a UL control channel #2 requesting scheduling for the traffic #2 may have different resources, and the serving base station may configure the resources to the terminal through upper layer signaling.

In this case, a case that there is a difference between buffer state information received from the terminal by the serving base station and the buffer state information held by the terminal may be considered.

Figure 18:
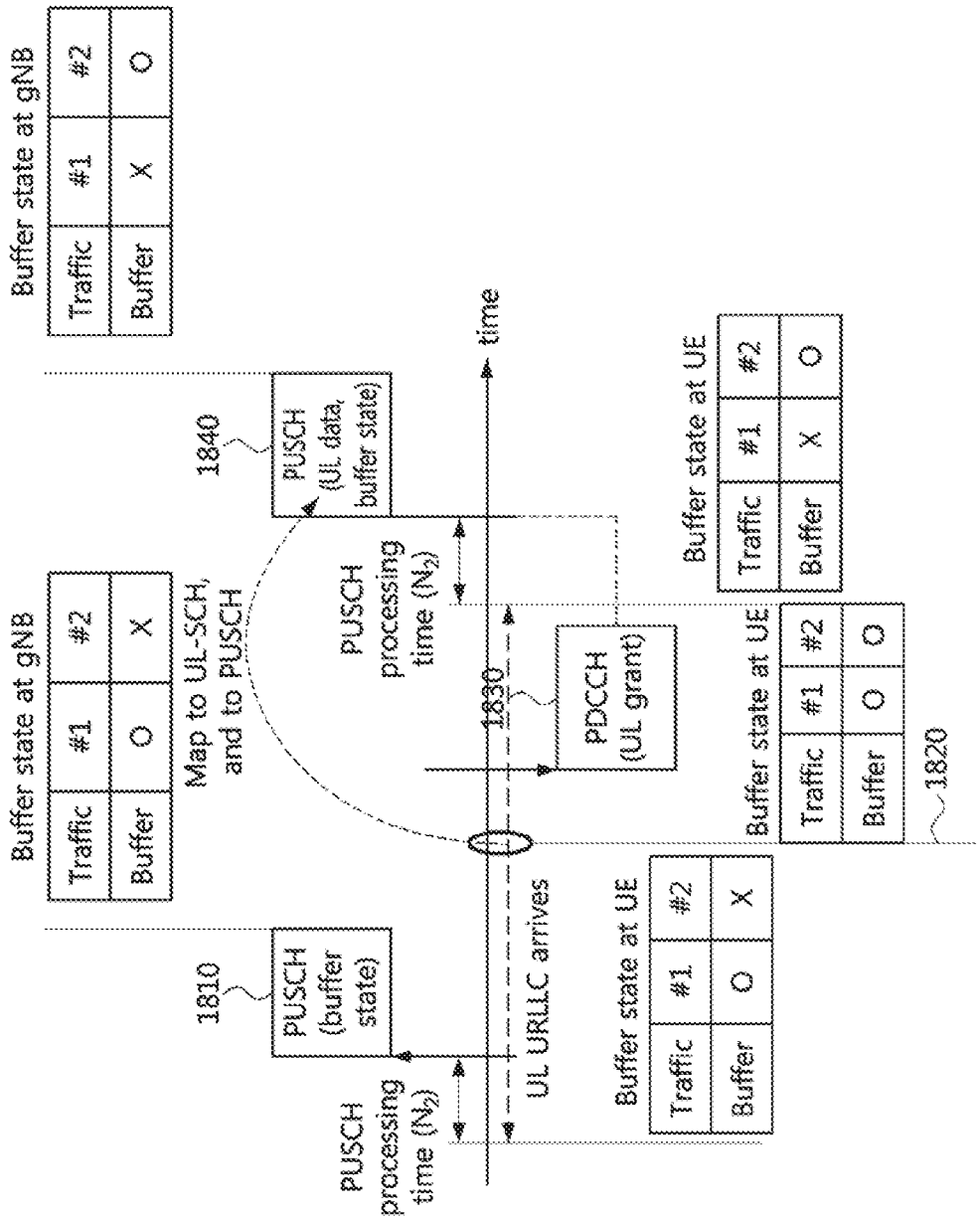
FIG. 18 is a conceptual diagram illustrating a situation in which a UL data channel is allocated in a state in which a buffer state is not updated.

FIG. 18 is a conceptual diagram illustrating a situation in which a UL data channel is allocated in which a buffer state is not updated.

As shown in FIG. 18, the terminal may generate a UL data channel (PUSCH) to report a buffer state to the serving base station (1810). Here, only the amount of the traffic #1 is reported because the traffic #1 exists and the traffic #2 does not exist. After starting to generate the UL data channel, the traffic #2 may arrive at the terminal (1820). However, since the serving base station does not yet know the existence of the traffic #2, in order to receive the traffic #1, the serving base station may transmit a DL control channel 1830 to the terminal to allocate a resource used for the UL data channel. Since the serving base station does not know the existence of the traffic #2, the serving base station may predict that the terminal will transmit the traffic #1 in a UL data channel 1840, and may indicate a coding rate, a TB size, and the amount of resources appropriate to the traffic #1 by using the DL control channel 1830.

In order to transmit the UL data channel, the terminal may compare the LCGIs of the traffic #1 and the traffic #2, and determine which traffic and how much traffic to transmit through the UL data channel according to a rule defined by the TS.

First, a case of transmitting the traffic #1 is considered. In this case, transmission of a buffer state and transmission of an SR for the traffic #2 may be performed as follows.

Figure 19:
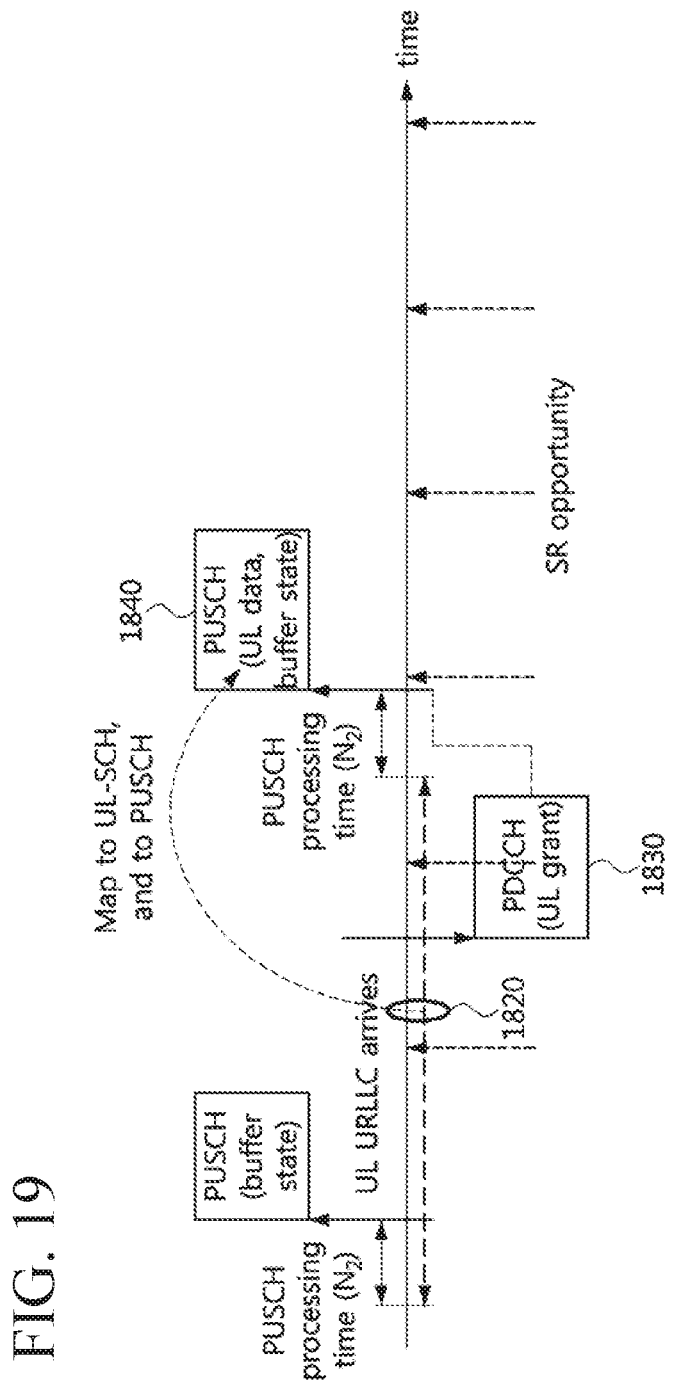
FIG. 19 is a conceptual diagram illustrating a case where a buffer state is reported and an SR is not transmitted.

FIG. 19 is a conceptual diagram illustrating a case where a buffer state is reported and an SR is not transmitted.

In the situation described in FIG. 18, the terminal may report the buffer state again without transmitting the SR. Here, the terminal may use the UL data channel 1840. The terminal may perform comparison on the LCGI only for the traffic #1, the buffer state of which has been reported to the serving base station. In case of the traffic (e.g., traffic #2) generated afterwards, the terminal may receive a separate DL control channel by separately requesting scheduling for the terminal or reporting the buffer state to the serving base station again. As shown in FIG. 19, since the terminal received the DL control channel 1830 and was indicated to transmit the UL data channel 1840, the terminal may not request scheduling again.

Therefore, the traffic #2 may not be mapped to the UL data channel 1840, and only the traffic #1 may constitute the UL data channel 1840. The traffic #2 should wait for a time corresponding to the UL data channel, and the serving base station may then transmit a DL control channel to the terminal again in order to transmit the traffic #2.

However, in order for the serving base station to know the existence of the traffic #2, the serving base station should successfully decode the UL data channel transmitted by the terminal, and wait until a transport block is processed in an upper layer (e.g., the MAC layer). Therefore, in order to inform the existence of the traffic #2 to the serving base station more quickly, it may be more effective to inform the existence of the traffic #2 by using a signal of the physical layer.

Figure 20:
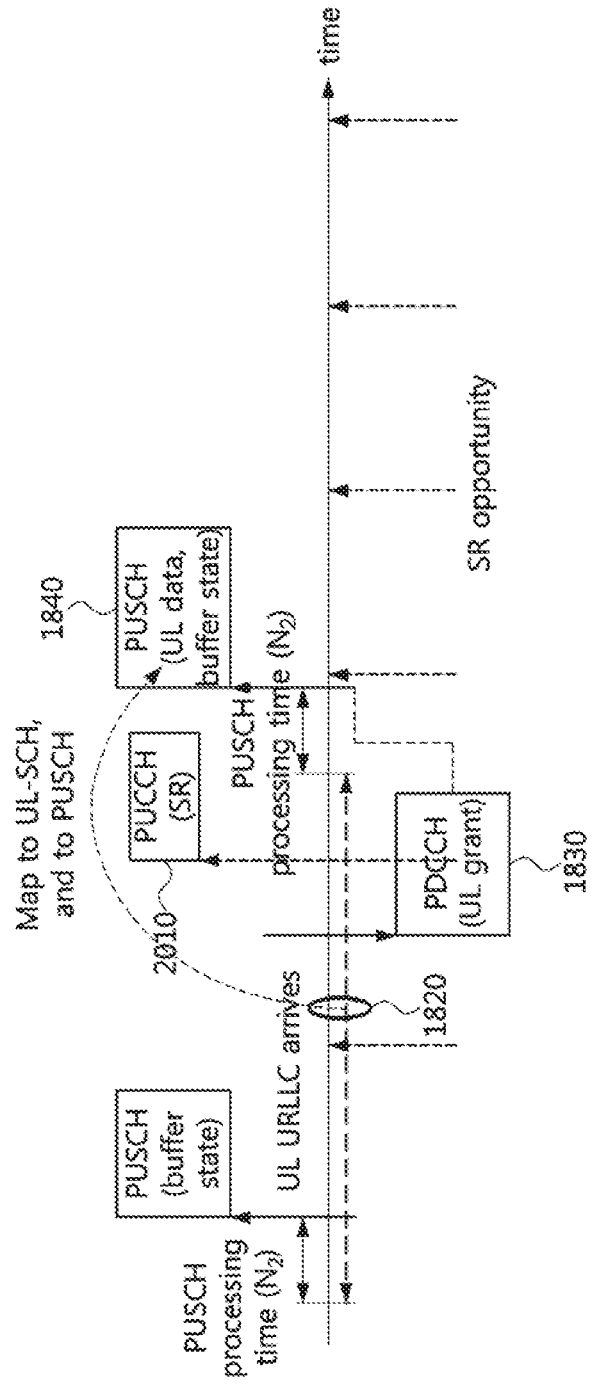
FIG. 20 is a conceptual diagram illustrating a case where a buffer state is reported, a UL grant is received, and an SR is transmitted.

FIG. 20 is a conceptual diagram illustrating a case where a buffer state is reported, a UL grant is received, and an SR is transmitted.

In the situation described in FIG. 18, if the terminal can transmit a UL control channel for transmitting an SR for the traffic #2, the terminal may transmit a UL control channel 2010 including the SR before transmitting the UL data channel 1840. After transmitting the SR, the terminal may map the traffic #1 instead of the traffic #2 to the UL data channel. The terminal may generate the UL data channel 1840 according to the buffer state having been reported to the serving base station. In order for the terminal to transmit the traffic #2, the serving base station should further transmit a DL control channel to the terminal. The terminal may report again the updated buffer state while transmitting the UL data channel 1840.

Meanwhile, in the situation shown in FIG. 20, there may be a case where a UL control channel (UL control channel including SR) configured to the terminal and a UL data channel allocated to the terminal overlap in some symbols. In this case, the terminal may transmit the UL control channel without transmitting the UL data channel, or may transmit the UL data channel without transmitting the UL control channel.

Figure 21:
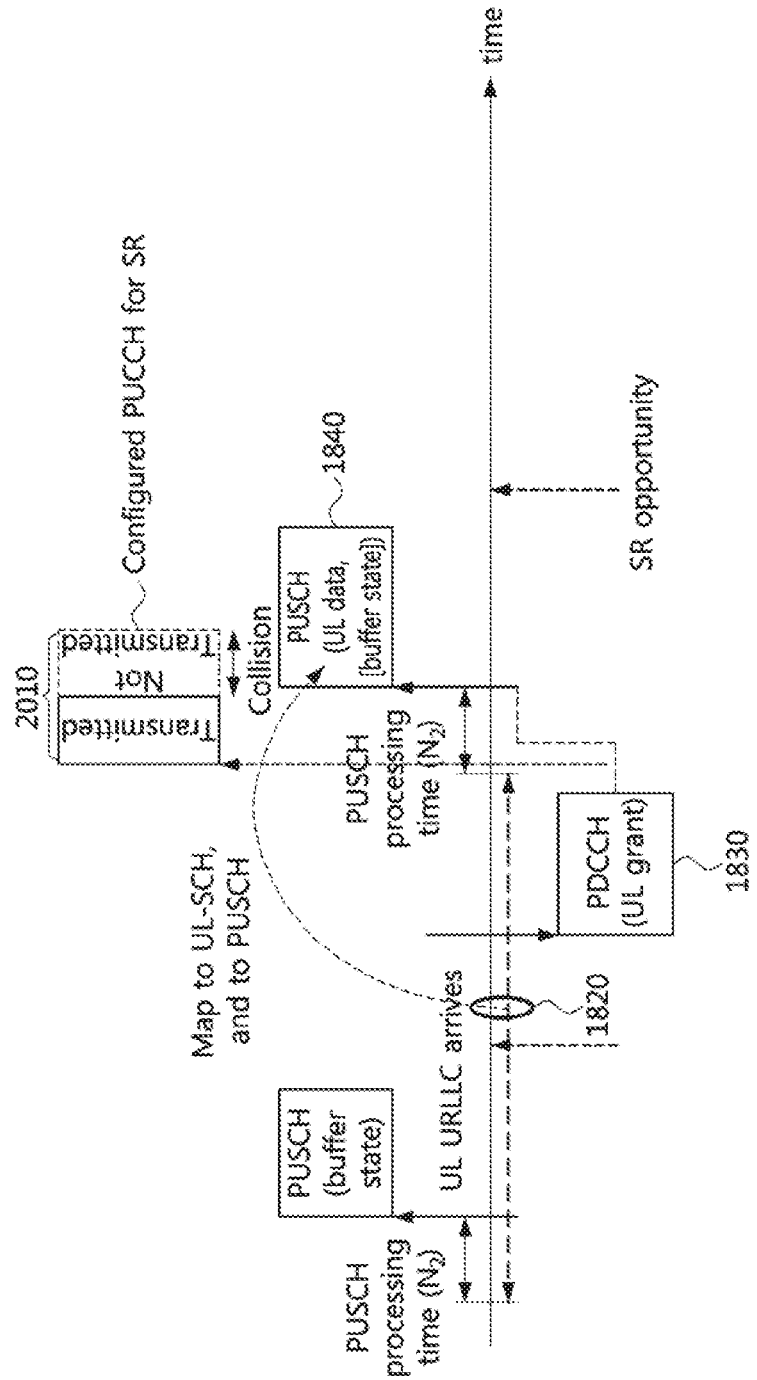
FIG. 21 is a conceptual diagram illustrating an example of reducing a length of an SR when the SR and a UL data channel are partially overlapped.

FIG. 21 is a conceptual diagram illustrating an example of reducing a length of an SR when the SR and a UL data channel are partially overlapped.

In a proposed method, the terminal may transmit a part of symbols of a UL control channel 2010 requesting scheduling. That is, the terminal may transmit only symbols that do not overlap the UL data channel 1840 to the serving base station. As shown in FIG. 21, the terminal may transmit the UL control channel 2010 by reducing the number of symbols of the UL control channel 2010. The terminal may not perform a separate behaviour for the reduced length, and may apply a spreading code having an original length. The serving base station may detect whether the terminal transmits the UL control channel 2010, and if the UL data is allocated, the serving base station may expect that the terminal does not transmit a part of the symbols constituting the UL control channel 2010.

The terminal may report again the updated buffer state while transmitting the UL data channel 1840.

Figure 22:
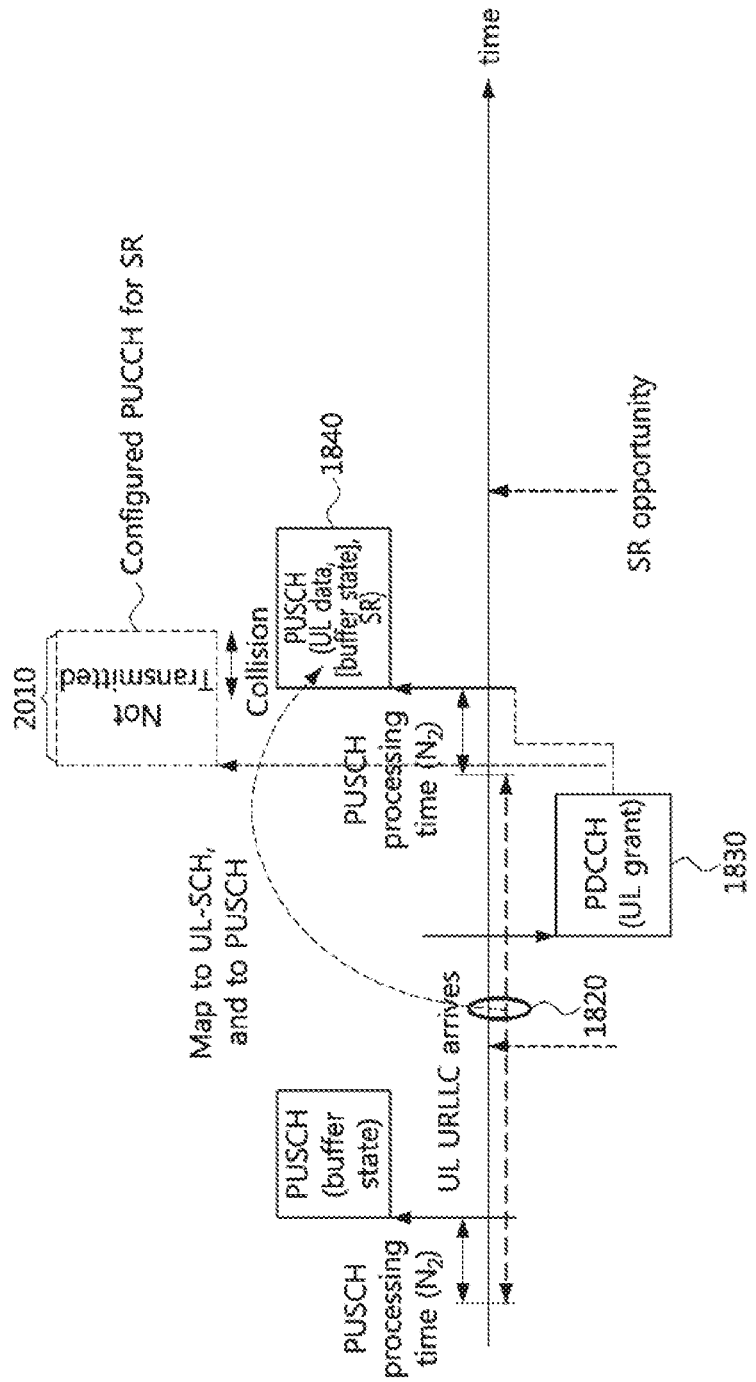
FIG. 22 is a conceptual diagram illustrating an example in which an SR is included in a UL data channel when the SR and the UL data channel partially overlap.

FIG. 22 is a conceptual diagram illustrating an example in which an SR is included in a UL data channel when the SR and the UL data channel partially overlap.

In a proposed method, the UL control channel 2010 requesting scheduling and the UL data channel 1840 may be multiplexed and transmitted as the UL data channel 1840. As shown in FIG. 22, the SR may be transmitted through the UL data channel 1840 as a type of UCI, as specified in the TS. The traffic #2 may not be mapped to the UL data channel 1840, and only the traffic #1 may constitute the UL data channel 1840. The traffic #2 should wait for a time corresponding to the UL data channel, and the serving base station may then transmit a DL control channel to the terminal again in order for the terminal to transmit the traffic #2. The terminal may report the updated buffer state again while transmitting the UL data channel 1840.

Referring again to FIG. 18, a case where the traffic #2 is transmitted first is considered. Since the terminal and the serving base station know the buffer state differently, the terminal may not transmit the UL data channel for the traffic #1 according to the received DL control channel, but transmit the UL control channel #2 to the serving base station in order to transmit the traffic #2. The serving base station may receive an SR associated with the traffic #2 while not decoding the UL data channel. The latency of the traffic #2 can be reduced compared to the method of FIGS. 19 and 20 in which the traffic #2 is not included in UL data channel 1840. However, the number of physical channels that the serving base station should detect may be increased. Also, since the terminal does not transmit the UL data channel for the traffic #1, if UCIs to be transmitted together with the UL data channel are present, the terminal may not transmit the UCIs.

In a proposed method, the terminal may transmit the UCIs to be transmitted in the UL data channel to the serving base station by mapping the UCIs to a UL control channel. In this case, the terminal may also multiplex the SR for the traffic #2 in the UL control channel. The method of multiplexing the UCIs and the SR may follow the procedure specified in the TS. This method may not delay the transmission of the UCIs to the serving base station. However, according to the existence of the traffic #2, the terminal should quickly generate the UL control channel, not the UL data channel. Therefore, if a time given to the terminal is not sufficient, the proposed method is not applied. For example, a value $N_2$ may be predetermined, and the proposed method may not be applied for the traffic #2 occurring within the $N_2$ symbols prior to the transmission of the UL data channel.

The serving base station may then transmit the DL control channel, which allocates the UL data channel for the traffic #2, to the terminal. Here, the UCIs may be mapped to the UL data channel.

Meanwhile, consider a case where the terminal is configured by the serving base station to transmit a UL data channel repeatedly (e.g., M times) through upper layer signaling. In order to transmit an SR, the terminal may use the proposed method. That is, a UL control channel including the SR may be transmitted without transmitting the UL data channel. In this case, the terminal may further adjust the number of times the UL data channel is transmitted. The terminal may decrease the number of times of transmitting the UL data channel to be less than M times, or maintain the number of times of transmitting the UL data channel to be M times by using additional time resources.

In a proposed method, even when the terminal transmits the SR instead of the UL data channel, the terminal may not transmit as many UL data channels as the number of times the SR is transmitted. For example, the terminal may transmit the UL data channel a smaller number of times (i.e., (M−H) times) than the M times by the number of times the SR is transmitted (e.g., H times).

In another proposed method, if the terminal transmits the SR instead of the UL data channel, the terminal may transmit the UL data channel by using a appropriate time resource (e.g., slot or mini-slot) thereafter. The terminal may determine a time resource available for transmitting the UL data channel, and eventually repeatedly transmit the UL data channel M times.

In a proposed method, the terminal may map the traffic #2 to the UL data channel in order to preferentially transmit the traffic #2, according to a rule defined in the TS. In an embodiment, the type of traffic to be mapped to the UL data channel may be determined by considering only the traffic arriving earlier than or identical to the timing at which the terminal reports the buffer state to the serving base station. Assuming the case of FIG. 18, the terminal may map the traffic #1 to the UL data channel.

In another embodiment, the traffic arriving later than the timing at which the terminal reports the buffer state to the serving base station may also be considered. A time (e.g., $N_2$ symbol) required for generating the UL data channel may be predetermined, and the traffic arriving before the timing may be assumed to be mapped to the UL data channel. Assuming the case of FIG. 18, the terminal may map the traffic #2 to the UL data channel.

In this case, a modulation order and a coding rate to be applied to the traffic #2 may be converted from a modulation order and a coding rate indicated by the DL control channel #1. The TS may include one or more conversion ratios, and if the TS includes more than two conversion ratios, the serving base station may configure a conversion ratio to the terminal through upper layer signaling. When the modulation order is changed, a reception complexity at the serving base station may increase, so that only the coding rate may be changed.

Since the serving base station does not know the modulation order and the coding rate or the coding rate applied by the terminal in advance, the serving base station should be able to determine whether the terminal transmits the traffic #2 or the traffic #1.

FIG. 23 is a conceptual diagram illustrating a method of mapping CSI (when only UCI exists) after traffic #2 is generated.

A case in which a UL data channel is composed of only UCI will be considered. When an HARQ-ACK is included in the UCI, the terminal may map the HARQ-ACK without mapping the CSI. The terminal may determine whether the UCI to be transmitted includes both a CSI part 1 and a CSI part 2 (S2310). When the CSI part 2 is included, the terminal may drop some or all of the CSI part 2 in order to transmit the traffic #2 (S2320). The terminal may determine whether a coding rate for the traffic #2 is satisfied by dropping some or all of the CSI part 2 (S2330). When the coding rate for the traffic #2 is satisfied, the terminal may transmit a UL data channel to which the traffic #2 and the CSI part 1 are mapped or a UL data channel to which the traffic #2, the CSI part 1 and the CSI part 2 are mapped (S2370). When the coding rate for the traffic #2 is not satisfied in the step S2330, the terminal may drop a further part of the CSI part 2 or drop all of the CSI part 2 (S2350).

When the UCI to be transmitted is determined not to include the CSI part 2 in the step S2310, since the UCI to be transmitted includes only the CSI part 1, the terminal may drop some or all of the CSI part 1 (S2350).

The terminal may determine whether a coding rate for the traffic #2 is satisfied by dropping some or all of the CSI part 1 (S2360). When the coding rate for the traffic #2 is satisfied, the terminal may transmit a UL data channel to which the traffic #2 and a part of the CSI part 1 are mapped (S2370). When the coding rate for the traffic #2 is not satisfied, the terminal may return to the step S2350, and drop a further part of the CSI part 1.

FIG. 24 is a conceptual diagram illustrating a method of mapping CSI (when both UCI and traffic #1 exist) after traffic #2 is generated.

The terminal may drop some or all of the CSI part 1 in order to map the traffic #2 (S2410). The terminal may determine whether a coding rate for the traffic #2 is satisfied by dropping some or all of the CSI part 1 (S2420). When the coding rate of the traffic #2 is not satisfied, the terminal may determine whether the CSI is included in the UCI to be transmitted, and may not map some or all of the CSI to the UL data channel.

Here, the method of not mapping some or all of the CSI to the UL data channel (S2430 to S2470) may be identical to the steps S2310 to S2360 described in FIG. 13.

In a proposed method, the terminal may transmit the traffic #2 instead of the traffic #1 in resource elements (REs) scheduled to be mapped to the traffic #1. That is, the terminal may transmit the traffic #2 instead of the traffic #1 by puncturing the REs for transmitting the traffic #1. The terminal may encode the traffic #1 and map it to the REs irrespective of the presence of the traffic #2, and if the traffic #2 is generated, the terminal may transmit the traffic #2 instead of the traffic #1. The serving base station may not reduce the error rate for the traffic #1 if the traffic #2 is generated.

In another proposed method, the terminal may adjust the coding rate for the traffic #1 so that the traffic #1 is encoded and mapped only to REs to which the traffic #2 is not mapped (i.e., rate matching). The terminal may change the encoding procedure of the traffic #1 according to the presence of the traffic #2. The serving base station may reduce the error rate for the traffic #1 if the traffic #2 is generated.

UCI Multiplexing when a Dynamic SFI is Applied

The serving base station may configure the terminal to report channel information periodically, to request scheduling, or to report an HARQ-ACK for a DL data channel through upper layer signaling. A resource of a UL control channel for reporting the channel information, a resource of a UL control channel requesting the scheduling, and a resource of a UL control channel for reporting the HARQ-ACK may be different from each other. If two or more of these UL control channels are allowed to be transmitted simultaneously in some UL symbols over time, a peak-to-average power ratio (PAPR) may increase, and an intermodulation distortion (IMD) may also increase. Therefore, when two or more UL control channels overlap in time, according to the TS, UCIs may be multiplexed and transmitted to the serving base station through another UL control channel resource.

The UCIs are concatenated in an order specified by the TS and encoded by a polar encoder. For the resource of the UL control channel used at this time, the terminal may determine a set of resources which the UL control channel can have according to the amount of UCIs (i.e., the number of bits). One resource may be determined according to a PRI detected in the DL control channel received by the terminal.

According to the conventional technique, when the terminal transmits a UL data channel or a UL control channel based on a DCI and they overlap in some UL symbols, the terminal may assume that a first UL symbol among these UL channels starts after a specific time. A specific time for an HARQ-ACK corresponding to a DL data channel may be $(N_1+1+d_{1,1}+d_{1,2})$ symbols. A specific time for an HARQ-ACK corresponding to a DL control channel for releasing an SPS (i.e., SPS PDSCH release) may be $(N_1+1+d_{1,1}+d_{1,2})$ symbols. A specific time for a DL control channel allocating a UL data channel may be $(N_2+1+d_{2,1})$ symbols. The values of $N_1$, $N_2$, $d_{1,1}$, $d_{1,2}$, and $d_{2,1}$ defined herein may be dependent on the capability of the terminal, and one of values predefined in the TS may be selected through upper layer signaling. The serving base station should be implemented so that there is no case where UL channels overlap in some UL symbols without following the time constraint. If the UL channels overlap in some UL symbols while keeping such the time, the terminal may multiplex the UCIs.

When the conventional technique is applied, a set Q may be defined, and as its elements, the set Q may have indexes of the UL control channels to be multiplexed. The set Q may be an ordered set. When there are UL resources starting earlier and UL resources starting later, the set Q may locate the UL resources starting earlier than the UL resources staring later. If there are more than one UL resources starting from the same symbol, an any UL resource may be located before than the other.

When the terminal is not configured to transmit HARQ-ACK and CSI simultaneously through upper layer signaling and a resource for transmitting HARQ-ACK corresponds to UL control channel formats 0 and 2, formats 2, 3 and 4 of a UL control channel configured as a resource for transmitting CSI may not be included in the set Q, only when they overlap the UL control channel for transmitting HARQ-ACK in some symbols. When the terminal is not configured to transmit HARQ-ACK and CSI simultaneously through upper layer signaling and a UL control channel corresponding to at least one resource among resources for transmitting HARQ-ACK has a format 1, 3 or 4, formats 3 or 4 of a UL control channel configured as a resource for transmitting CSI may not be included in the set Q, and a format 2 of a UL control channel configured as a resource for transmitting CSI may not be included in the set Q only when it overlaps the UL control channel for transmitting HARQ-ACK in some symbols.

Hereinafter, a description will be given of a procedure for multiplexing UCIs into one UL control channel when a conventional technique is applied.

C(Q) may mean the number of elements of the set Q. Q(j,0) denotes the first symbol of the j-th element Q(j) of the set Q in the corresponding slot. L(Q(j)) denotes the number of symbols of Q(j) in the corresponding slot. Here, j indicates an element belonging to the set Q, and j may be set to 0 as an initial value. o may be defined as a variable that counts resources some symbols of which overlap over time, and o may be set to 0 as an initial value.

If some of the symbols of Q(j−o), Q(j−o+1), . . . , Q(j) overlap in Q(j+1), operations of 'o=o+1' and 'j=j+1' may be performed. This step may be a process of finding objects to be combined with the UL control channel, and when combined, o resources may correspond thereto.

Otherwise, since all the symbols of Q(j−o), Q(j−o+1), . . . , and Q(j) do not overlap in Q(j+1), when o=O, only an operation of 'j=j+1' may be performed because a resource to be combined does not exist. When o>0, Q(j−o), Q(j−o+1), . . . , and Q(j) may be combined. That is, UCIs of Q(j−o), Q(j−o+1), . . . , and Q(j) may be concatenated, a set of UL control channels corresponding to the number of UCIs may be chosen, and a resource to be used by a UL control channel may be determined by using a PRI and a CCE indicated by a DL control channel. The resulting resource may be referred to as the j-th resource (Q(j)), and utilized in a subsequent sorting procedure. Thereafter, the size of the set Q may be reduced so that the resources already combined are not included in the set Q. This may be expressed as Q\{Q(j−o), Q(j−o+1), . . . , Q(j)}. j may be set to 0, o may be set to 0, and resources belonging to the set Q may be sorted. The meaning of the sorting here is to have the first symbol of the resources belonging to the set Q ahead and to have a smaller number of symbols if the first symbol is the same. Otherwise, the indexes of the resources may be exchanged with each other.

If the value of j is smaller than C(Q)−1 (i.e., j<C(Q)−1), the terminal may return to the step of determining whether o resources from Q(j) temporally overlap with Q(j+1), and perform the above-described procedure identically.

The reason why the iteration is needed is that if o resources are combined into one, there may be a case where the previously-combined resources and new resources to be considered overlap temporally in some symbols. In such the case, the procedure of combining should be performed again.

Meanwhile, if the terminal dynamically receives a slot format indicator (SFI) from a DL control channel (e.g., DCI format 2_0), after the DL control channel is received, a flexible (FL) symbol belonging to the corresponding slot may be maintained as an FL symbol, or may be converted to a downlink (DL) symbol or an uplink (UL) symbol.

According to the TS, if the DL control channel is not related to any of the UCIs to be included in the UL control channel, the terminal may transmit a UL control channel only in the UL symbols. For example, periodic CSI or SR, HARQ-ACK for a periodic DL control channel, and combinations thereof may correspond to such the UCIs. In the case that the FL symbol is converted to a DL symbol or a FL symbol, the terminal may not transmit the corresponding UL control channel. On the other hand, when the DL control channel is related to some UCIs that the UL control channel includes, the terminal may transmit the UL control channel in the UL symbols or in the FL symbols. For example, UCIs including an HARQ-ACK for the dynamically-allocated DL control channel may correspond to such the UCIs. If the FL symbol is converted into a DL symbol, the terminal may not transmit the corresponding UL control channel.

In the following description, a scenario in which an SFI is dynamically given while a resource used by the UL control channel is determined by multiplexing the UCIs will be considered. A proposed method may be divided into two steps. Only one step may be applied, or both steps may be applied.

The first step is related to a method of selecting UL control channels to be multiplexed and may depend on the dynamically detected SFI. The second step is related to a method of reducing the amount of UCIs included in the UL control channel when the resource of the multiplexed UL control channels is determined as not available for transmission according to the dynamically detected SFI (i.e., the FL symbol is converted to a DL symbol). Here, when FL symbols are configured to the terminal through upper layer signaling, the FL symbols may be finally determined as FL symbols, DL symbols, or UL symbols using the dynamic SFI.

(1) Method for Forming a Set Q by Selecting UL Control Channels (First Step)

In a proposed method, UL control channels to be transmitted in the corresponding slots may be included as elements of the set Q, irrespective of the SFI dynamically detected in the process of forming the set Q.

Similarly to the conventional technique, the dynamically detected SFI may not be applied when forming the set Q. However, if there is a UL control channel having a symbol dynamically determined as the FL symbol, the amount of UCIs transmitted by the terminal may vary depending on whether or not to transmit an HARQ-ACK for a dynamically allocated DL data channel. For example, it is possible to consider a case where a resource 1 of the UL control channel is configured to the terminal through upper layer signaling or the like so that the terminal transmits an SR or a CSI in the corresponding slot. In this case, if the resource 1 of the UL control channel has the FL symbol, the terminal may not perform transmission in the corresponding slot. However, an HARQ-ACK for a dynamically allocated DL data channel may be transmitted in the corresponding slot, and there may be also a UL control channel 2 associated to this. At this time, if the terminal does not transmit the UL control channel 2 due to DTX event, since the terminal does not transmit the UL control channel 1, the terminal does not transmit any UCI to the serving base station in the corresponding slot. However, when the terminal transmits the UL control channel 2 due to no DTX event, if the UL control channel 1 and the UL control channel 2 overlap each other in some symbols, the terminal may multiplex all the UCIs associated with them similarly to the conventional technique. Therefore, the serving base station may detect a case where both the HARQ-ACK and the CSI are transmitted or a case where nothing is transmitted. Considering a case where the terminal receives the dynamic SFI incorrectly, there may be also a case where the CSI is transmitted and the HARQ-ACK is not transmitted. However, since a probability of occurrence of such the case such as repeated transmissions of the SFI is low, it may not be considered.

In another proposed method, some of the UL control channels to be transmitted in the corresponding slot may not be included in the set Q as elements by considering the dynamically detected SFI in the process of forming the set Q. Only when each UCI and its associated UL control channel resource are allowed to be transmitted according to the SFI, they may be used as elements of the set Q. If there is a symbol that is dynamically converted to an FL symbol or a DL symbol by the SFI, the corresponding UCI may not be considered in the set Q. UCIs that are not allocated resources by the DL control channel can be transmitted through the UL control channel only on the UL symbols after applying the SFI, so that the UL control channel composed of only UL symbols and the UCI associated therewith may be included in the set Q. UCIs that are allocated resources by DL control channel can be transmitted through the UL control channel in FL symbols or UL symbols after applying the SFI, so that only such the UL control channel and its associated UCI may be included in the set Q.

UL control channel 1 and UL control channel 2 with the same meaning as in the example described above is considered. In another proposed method, the UL control channel 1 may not be included in the set Q, and only UCI corresponding to the UL control channel 2 may be included in the set Q. Therefore, the serving base station may detect a case where all of HARQ-ACKs are transmitted or a case where nothing is transmitted.

(2) Method for Reducing the Amount of UCIs (Second Step)

Consider after the conventional procedure of combining the UL control channels into one. A case where a symbol of resources of UL control channels combined by the terminal after the SFI is detected dynamically is determined as an FL symbol or a DL symbol will be considered.

In a proposed method, the combined UL control channels may be transmitted or may not be transmitted according to the dynamic SFI. In other words, this may mean, as a condition for the terminal to transmit a UL control channel, a case in which a symbol determined as a DL symbol does not exist in the UL control channel where an HARQ-ACK for a dynamically-allocated DL data channel is included. Also, this may mean, as another condition for the terminal to transmit a UL control channel, a case in a symbol determined as an FL symbol or a DL symbol does not exist in the UL control channel where an HARQ-ACK for a dynamically-allocated DL data channel among UCIs to be considered is not included. The terminal does not transmit a UL control channel except for the above cases.

Therefore, according to the dynamic SFI, the terminal may multiplex all the UCIs included in the set Q or may not transmit all the UCIs included in the set Q, among the UCIs for the terminal to transmit in the corresponding slot. Although the above-described method is advantageous in simplicity, the terminal may not transmit any UCI according to the dynamic SFI of the combined UL control channel. For example, consider a UL control channel 1 and UL control channel 2 with the same meaning as in the example described above. Although each UL control channel is determined to be FL symbols or UL symbols by a dynamic SFI and respective UCIs can be transmitted, the combined UL control channel may be determined to include FL symbols or DL symbols. In this case, it is preferable that the terminal transmits some UCIs rather than not transmitting all the UCIs.

In another proposed method, when a situation where the combined UL control channel cannot be transmitted occurs, the amount of UCIs may be reduced and multiplexed. That is, the terminal may not multiplex a part of the UCIs belonging to the set Q but newly derive a UL control channel corresponding thereto. Here, the newly-derived UL control channel should be able to be transmitted by the terminal. Therefore, the amount of UCIs may be reduced until a resource of a UL control channel that the terminal can transmit is derived. Here, a criterion for selecting UCIs that the terminal does not multiplex (i.e., the terminal drops) is needed. It is possible to classify UCI types and interpret them as priorities, or to classify the order of resources of UL control channels and interpret them as priorities.

As a criterion for selecting some of the UCIs constituting the set Q, a method of using the order of the resources of the UL control channels corresponding to the UCIs will be exemplified. According to the conventional TS, among the UL control channels corresponding to the UCI, the earlier first symbol of the UL control channels and the shorter in length are arranged in order, and the UCI included therein may be multiplexed.

For convenience of explanation, it may be assumed that the n UCIs are arranged in order, a UCI generated through a k-th multiplexing may be referred to as a UCI (k), and a resource of the UL control channel corresponding thereto may be referred to as a UL resource (k). Therefore, UCI (0), . . . . and UCI (n−1), and UL resource (0), . . . , and UL resource (n−1) may be given.

Applying a proposed method, it may be determined by using a dynamic SFI whether the UL resource (n−1) generated at last can be transmitted. If the terminal can transmit the UL resource (n−1), subsequent processes may be skipped and the terminal may include the UCI (n−1) in a UL control channel, and transmit the UL control channel in the UL resource (n−1). If the terminal cannot transmit the UL resource (n−1), only UCI (n−2) excluding a part of UCIs from the UCI (n−1) multiplexed at the last stage of multiplexing the UCIs may be multiplexed. Then, the terminal may determine whether the UL resource (n−2) can be transmitted. If the terminal can transmit the UL resource (n−2), subsequent processes may be skipped and the terminal may include the UCI (n−2) in a UL control channel, and transmit the UL control channel in the UL resource (n−2). If the terminal cannot transmit the UL resource (n−2), only UCI (n−3) excluding a part of UCIs from the UCI (n−2) multiplexed at the last stage of multiplexing the UCIs may be multiplexed. The terminal may repeatedly perform the above procedures.

CSI Multiplexing which a Dynamic SFI is Applied

Consider a case where the terminal is configured to transmit two or more UL control channels in one slot.

The serving base station may configure CSI measurement links and CSI resource settings to the terminal by using a single CSI reporting setting indication through upper layer signaling. The CSI reporting setting indication of the terminal may be associated with one UL control channel through upper layer signaling. The UL control channel may include at least a time resource and a frequency resource that the terminal transmits. The UL control channel transmitted by the terminal may include a part of CSI. This may be a first PMI, a CQI, or the like. A reporting periodicity of a PCSI may have a value of sl5, sl10, sl20, sl40, sl80, sl160, or sl320, and a slot offset may be set to an integer smaller than the cycle.

The serving base station may configure a list indicating UL control channels to the terminal through upper layer signaling. Here, the UL control channel may be a resource for transmitting a semi-persistent CSI (SPCSI) and/or a periodic CSI (PCSI). For convenience, the SPCSI or the PCSI may be referred to as CSI.

When the SPCSI and/or PCSI occurs more than once to one terminal in a given slot, regardless of whether some of the symbols occupied by the respective UL control channels corresponding to the SPCSI and/or PCSI overlap, the terminal may multiplex the SPCSI and/or the PCSI, and map them to one UL control channel belonging to the list.

The terminal may not be configured with the list. The terminal may transmit one or two UL control channels in a given slot, so that each UL control channel selected by the terminal includes one SPCSI or PCSI corresponding to each. The SPCSI or PCSI corresponding to the highest priority may be selected as the first UL control channel. There may be SPCSI or PCSI corresponding to UL control channels that do not overlap the first UL control channel. The terminal may select an SPCSI or PCSI that does not overlap with the first UL control channel in all symbols and has the highest priority among the remaining SPCSIs or PCSIs except the CSI corresponding to the first UL control channel. Here, the priority may refer to a priority of the CSI to report to the serving base station. Therefore, it may have the second priority or a lower priority. The terminal may transmit the second UL control channel corresponding to the selected SPCSI or PCSI. Both the first UL control channel and the second UL control channel do not have a long duration (4 symbols or more), and one among the two control channels should be limited to have a short duration (0 symbol or 2 symbols). For example, in case of the NR, if two UL control channels are transmitted in a slot, at least one UL control channel should be set to the format 2.

(1) Method for Deriving a PUCCH Resource for CSI Reporting in Consideration of a Dynamic SFI The NR system considers the dynamic SFI. After receiving an upper layer signaling and a DL control channel (e.g., DCI format 2_0 in case of the NR), the terminal may classify symbols belonging to a slot into DL symbols, UL symbols, and FL symbols. The UL control channel including PCSI and/or SPCSI can be transmitted by the terminal only when the corresponding resources are composed of UL symbols only.

Therefore, when a terminal intends to transmit two or more UL control channels in a given slot, the terminal may consider a dynamic SFI when applying a method of selecting SPCSI or PCSI.

In a proposed method, PCSI or SPCSI may be multiplexed by applying the conventional scheme regardless of a dynamic SFI. When the terminal is configured with a list (i.e., when the terminal is not configured to perform repeated transmissions, the terminal is configured with a list, and the terminal is configured to receive a dynamic SFI), the terminal may use one UL control channel belonging to the list. Thereafter, in the process of transmitting the derived UL control channel, the terminal may not transmit the UL control channel considering the dynamic SFI. When the terminal is not configured with a list (i.e., when the terminal is not configured to perform repeated transmissions, the terminal is not configured with a list, and the terminal is configured to receive a dynamic SFI), the terminal may derive UL control channels that do not overlap with each other, and select a PCSI or SPCSI having a higher priority. Thereafter, in the process of transmitting the derived UL control channel, the terminal may not transmit the UL control channel considering the dynamic SFI.

In another proposed method, when the UL control channel corresponding to SPCSI or PCSI includes UL symbols only, it may be determined which SPSCI or PCSI the terminal selects according to the dynamic SFI.

When the terminal is not configured with a list (i.e., when the terminal is not configured to perform repeated transmissions, the terminal is not configured with a list, and the terminal is configured to receive a dynamic SFI), if each SPCSI or PCSI has a DL symbol or an FL symbol other than a UL symbol according to the dynamic SFI, the SPCSI or PCSI may be excluded from the multiplexing. The terminal may regard only the UL control channels having only UL symbols as valid, and calculate priorities of only SPCSIs or PCSIs associated to valid UL control channels. Among these, the terminal may select one or two CSI reports having the highest priorities.

When the terminal is configured with a list, the terminal may multiplex SPCSIs or PCSIs generated within a slot, and determine one UL control channel corresponding thereto. In this case, the following methods may be applied.

In yet another proposed method, when the terminal is not configured to perform repeated transmissions, the terminal is configured with a list, and the terminal is configured to receive a dynamic SFI, if the UL control channel selected by the terminal has a DL symbol or an FL symbol other than an UL symbol according to the dynamic SFI, the terminal may not transmit the UL control channel. Therefore, the terminal may not report SPCSI or PCSI to the serving base station.

In yet another proposed method, when the terminal is not configured to perform repeated transmissions, the terminal is configured with a list, and the terminal is configured to receive a dynamic SFI, the terminal receives J (J=1 or 2) resources as the list. The UL control channel selected by the terminal is referred to as the j-th resource (j=0 or 1). The terminal may identify whether the j-th resource is composed of only UL symbols according to the dynamic SFI. If it is composed of only UL symbols, the terminal may select the j-th resource, and transmit a UL control channel. However, if it has a DL symbol or an FL symbol other than a UL symbol, the terminal may select an i-th resource other than the j-th resource (i=0 or 1, i≠j). The terminal may identify whether the i-th resource is composed of UL symbols only according to the dynamic SFI. If it is composed of only UL symbols, the terminal may select the i-th resource, and transmit a UL control channel. The terminal may transmit all of the SPCSIs or PCSIs or drop a part of the SPCSIs or PCSIs while using the i-th resource. When all the SPCSIs or PCSIs are transmitted, a bandwidth of the UL control channel may be reduced in order to comply with the coding rate configured to the terminal. When a part of SPCSIs or PCSIs are excluded, another PCSI or PCSI may be additionally multiplexed. The PCSIs or SPCSIs that have been excluded due to a low priority may additionally multiplexed. Also, a corresponding new UL control channel (i-th resource or j-th resource) may be transmitted according to the dynamic SFI. In an additionally-introduced procedure, a part of PCSIs or SPCSI may be excluded, and another PCSI or SPCSI may be added, until the UL control channel can be transmitted according to the dynamic SFI. Among PCSIs or SPCSIs, some PCSIs or SPCSIs may be selected according to predetermined priorities. Here, the priorities may mean priorities to select some of the CSI reports.

The terminal may apply a coding rate configured from the serving base station through upper layer signaling, and reduce the amount of SPCSIs or PCSIs or the bandwidth of the UL control channel to be suitable for the i-th resource. However, when even the i-th resource is not composed of only UL symbols according to a dynamic SFI, the terminal may not transmit any UL control channel. Therefore, the terminal may report SPCSI or PCSI to the serving base station.

The terminal may be configured through upper layer signaling to repeatedly transmit the UL control channel while transmitting the CSI. In a proposed method, when the terminal is configured to perform repeated transmissions, the terminal is configured with a list, and the terminal is configured to receive a dynamic SFI, the terminal may derive a valid UL control channel in all of two or more slots in which a UL control channel is transmitted. A method of deriving a valid UL control channel may imply applying the methods described above in more than two slots not applying to only one slot. Therefore, a UL control channel always having UL symbols in repeatedly transmitted slots may be selected by using the dynamic SFI. The terminal may be assumed to always know formats of its transmitting UL control channel in all slots by using a dynamic SFI, and a case where the terminal does not know the formats is assumed not to occur.

In another proposed method, when the terminal is configured to perform repeated transmissions, the terminal is configured with a list, and the terminal is configured to receive a dynamic SFI, the terminal may follow the above scheme in the first slot among two or more slots in which a UL control channel is transmitted. In later slots, the terminal does not transmit the UL control channel not composed of only UL symbols.

(2) Method for Deriving a PUCCH Resource for CSI Reporting and Other Upper Layer Configured PUCCH in Consideration of a Dynamic SFI In addition to CSI, there may be other UCIs that have been configured through upper layer signaling. These may include an SR or an HARQ-ACK for a semi-persistently allocated DL data channel. A case where resources of a UL control channel for transmitting other UCIs and a UL control channel for CSI reporting overlap in some symbols may be considered. A method of selecting a specific CSI for the UL control channel for CSI reporting according to a dynamic SFI may follow the above-described method, and then other UCIs may be concatenated with the CSI as a payload. In this case, the order of concatenation with CSI may be different according to whether the specific UCI is an SR or an HARQ-ACK.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A method for transmitting an uplink control channel, performed in a terminal, the method comprising:
receiving, from a base station, information on a period of repeated transmissions and a number of repeated transmissions for a scheduling request (SR); and
repeatedly transmitting an uplink control channel including the SR by the number of repeated transmissions according to the period of repeated transmissions,
wherein the uplink control channel including the SR is transmitted once or two times in a slot, and
wherein, when the SR is transmitted two or more times in a slot, the SR is frequency-hopped within a slot or frequency-hopped at a slot boundary according to a configuration through upper layer signaling of the base station.

2. The method according to claim 1, wherein the period of repeated transmissions corresponds to 7 symbols.

3. The method according to claim 1, wherein the number of repeated transmissions is determined according to a type of a traffic corresponding to the SR or a format of the uplink control channel including the SR.

4. The method according to claim 1, wherein, when the SR is transmitted once in a slot, the uplink control channel including the SR is transmitted in same symbols in each slot.

5. The method according to claim 1, wherein, when the SR is transmitted two times in a slot, the uplink control channel including the SR is transmitted in same symbols in each slot or in different symbols in each slot.

6. The method according to claim 1, wherein, when a part or all of symbols in which the uplink control channel including the SR is transmitted overlap with a part or all of symbols of an uplink control channel including uplink control information other than the SR, the uplink control channel including the SR and the uplink control channel including the uplink control information other than the SR are transmitted as multiplexed.

7. The method according to claim 6, wherein different transmission powers are applied to symbols in which only the uplink control channel including the SR is transmitted, symbols in which the uplink control channel including the SR and the uplink control channel including the uplink control information other than the SR are transmitted as multiplexed, and symbols in which only the uplink control channel including the uplink control information other than the SR is transmitted.

8. The method according to claim 1, wherein, when the uplink control channel including the SR is not transmitted in symbols according to the period of repeated transmissions, a medium access control (MAC) layer of the terminal does not increase a repeated transmission counter for the SR.

9. The method according to claim 1, wherein, when the SR is frequency-hopped within a slot, the SR is frequency-hopped at a half-slot boundary.

10. A method for transmitting an uplink control channel, performed in a terminal, the method comprising:
receiving, from a base station, information on a period of repeated transmissions and a number of repeated transmissions for a first scheduling request (SR) and information on a period of repeated transmissions and a number of repeated transmissions for a second SR;
comparing a priority of the first SR with a priority of the second SR, when a part or all of symbols of a first uplink control channel including the first SR according to the period of repeated transmissions for the first SR overlap with a part or all of symbols of a second uplink control channel including the second SR according to the period of repeated transmissions for the second SR; and
transmitting the second uplink control channel without transmitting the part or all of the symbols of the first uplink control channel, when the priority of the second SR is higher than the priority of the first SR,
wherein each of the first uplink control channel including the first SR and the second uplink control channel including the second SR is transmitted once or two times in a slot, and
wherein, when the first SR is transmitted two or more times in a slot, the first SR is frequency-hopped within a slot or frequency-hopped at a slot boundary according to a configuration through upper layer signaling of the base station, or when the second SR is transmitted two or more times in a slot, the second SR is frequency-hopped within a slot or frequency-hopped at a slot boundary according to a configuration through upper layer signaling of the base station.

11. The method according to claim 10, wherein each of the period of repeated transmissions for the first SR and the period of repeated transmissions for the second SR corresponds to 7 symbols.

12. The method according to claim 10, wherein the number of repeated transmissions for the first SR is determined according to a type of a traffic corresponding to the first SR or a format of the first uplink control channel including the first SR, and the number of repeated transmissions for the second SR is determined according to a type of a traffic corresponding to the second SR or a format of the second uplink control channel including the second SR.

13. The method according to claim 10, wherein the second SR is an SR corresponding to a low-latency traffic as compared to a traffic corresponding to the first SR.

14. The method according to claim 10, wherein, when the part or all of the symbols of the first uplink control channel are not transmitted, a medium access control (MAC) layer of the terminal increases a repeated transmission counter for the second SR without increasing a repeated transmission counter for the first SR.

* * * * *